US012634646B2

(12) United States Patent
Van Den Heuvel et al.

(10) Patent No.: US 12,634,646 B2
(45) **Date of Patent: *May 19, 2026**

(54) IDENTIFYING HEARING PROSTHESIS ACTUATOR RESONANCE PEAK(S)

(71) Applicant: Cochlear Limited, Macquarie University (AU)

(72) Inventors: Koen Erik Van Den Heuvel, Mechelen (BE); Werner Meskens, Mechelen (BE)

(73) Assignee: Cochlear Limited, Macquarie University (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,279

(22) Filed: Mar. 4, 2024

(65) Prior Publication Data

US 2024/0292166 A1 Aug. 29, 2024

Related U.S. Application Data

(60) Division of application No. 17/008,858, filed on Sep. 1, 2020, now Pat. No. 11,924,614, which is a (Continued)

(51) Int. Cl.
*H04R 25/00* (2006.01)

(52) U.S. Cl.
CPC ....... *H04R 25/606* (2013.01); *H04R 2460/13* (2013.01)

(58) Field of Classification Search
None
See application file for complete search history.

(56) References Cited

U.S. PATENT DOCUMENTS 3,958,558 A 5/1976 Dunphy et al.
4,127,110 A 11/1978 Bullara
(Continued)

FOREIGN PATENT DOCUMENTS

EP 0124798 A1 11/1984
WO 0049837 A1 8/2000
(Continued)

OTHER PUBLICATIONS

International Search Report and Written Opinion for PCT/IB2012/052337 mailed Dec. 12, 2012.

*Primary Examiner* — Thaddeus B Cox
(74) *Attorney, Agent, or Firm* — Pilloff Passino & Cosenza LLP; Martin J. Cosenza

(57) ABSTRACT

An auditory prosthesis comprising an actuator for providing mechanical stimulation to a recipient. The auditory prosthesis comprises a measurement circuit for use in determining the resonance peak(s) of the actuator. In an embodiment, the measurement circuit measures the voltage drop across the actuator and/or current through the actuator during a frequency sweep of the operational frequencies of the actuator. These measured voltages and/or currents are then analyzed for discontinuities that are indicative of a resonance peak of the actuator. In another embodiment, rather than using a frequency sweep to measure voltages and/or currents across the actuator, the measurement circuit instead applies a voltage impulse to the actuator and then measure the voltage and/or current across the actuator for a period of time after application of the impulse. The measured voltages and/or currents are then analyzed to identify resonance peak(s) of the actuator.

19 Claims, 19 Drawing Sheets

Related U.S. Application Data continuation of application No. 15/670,301, filed on Aug. 7, 2017, now Pat. No. 10,764,696, which is a continuation of application No. 13/106,335, filed on May 12, 2011, now Pat. No. 9,729,981.

(56) References Cited

U.S. PATENT DOCUMENTS

| | | | |
|---|---|---|---|
| 4,237,900 | A | 12/1980 | Schulman et al. |
| 4,485,813 | A | 12/1984 | Anderson et al. |
| 5,277,694 | A | 1/1994 | Leysieffer et al. |
| 5,282,858 | A | 2/1994 | Bisch et al. |
| 5,456,654 | A | 10/1995 | Ball |
| 5,554,096 | A | 9/1996 | Ball |
| 5,624,376 | A | 4/1997 | Ball et al. |
| 5,857,958 | A | 1/1999 | Ball et al. |
| 5,899,847 | A | 5/1999 | Adams et al. |
| 5,938,691 | A | 8/1999 | Schulman et al. |
| 5,941,904 | A | 8/1999 | Johnston et al. |
| 6,077,215 | A | 6/2000 | Leysieffer |
| 6,099,495 | A | 8/2000 | Kinghorn et al. |
| 6,162,169 | A | 12/2000 | Leysieffer |
| 6,171,229 | B1 | 1/2001 | Kroll et al. |
| 6,190,305 | B1 | 2/2001 | Ball et al. |
| 6,238,367 | B1 | 5/2001 | Christiansen et al. |
| 6,259,951 | B1 | 7/2001 | Kuzma et al. |
| 6,269,318 | B1 | 7/2001 | Geddes |
| 6,390,970 | B1 | 5/2002 | Müller |
| 6,663,575 | B2 | 12/2003 | Leysieffer |
| 6,855,104 | B2 | 2/2005 | Schmid et al. |
| 6,945,999 | B2 | 9/2005 | Schneider et al. |
| 7,137,946 | B2 | 11/2006 | Waldmann |
| 7,153,257 | B2 | 12/2006 | Schneider et al. |
| 7,204,800 | B2 | 4/2007 | Easter et al. |
| 7,239,711 | B1 | 7/2007 | Andersen et al. |
| 7,273,447 | B2 | 9/2007 | Schneider et al. |
| 7,278,963 | B2 | 10/2007 | Schneider et al. |
| 7,447,533 | B1 | 11/2008 | Fang et al. |
| 7,468,028 | B2 | 12/2008 | Schneider et al. |
| 7,509,169 | B2 | 3/2009 | Eigler et al. |
| 7,522,962 | B1 | 4/2009 | Doron et al. |
| 7,570,998 | B2 | 8/2009 | Zhang et al. |
| 7,580,750 | B2 | 8/2009 | Doron et al. |
| 7,606,621 | B2 | 10/2009 | Brisken et al. |
| 2002/0026091 | A1 | 2/2002 | Leysieffer |
| 2003/0163022 | A1 | 8/2003 | Miller et al. |
| 2005/0096561 | A1 | 5/2005 | Conn et al. |
| 2006/0247488 | A1 | 11/2006 | Waldmann |
| 2006/0269076 | A1 | 11/2006 | Miller et al. |
| 2007/0286441 | A1 | 12/2007 | Harsch et al. |
| 2012/0095284 | A1 | 4/2012 | Westerkull et al. |
| 2012/0286765 | A1 | 11/2012 | Heuvel et al. |
| 2013/0172662 | A1 | 7/2013 | Menzl et al. |

FOREIGN PATENT DOCUMENTS

| | | | |
|---|---|---|---|
| WO | 03073789 | A1 | 9/2003 |
| WO | 2006062525 | A2 | 6/2006 |

IDENTIFYING HEARING PROSTHESIS ACTUATOR RESONANCE PEAK(S)

CROSS-REFERENCE TO RELATED APPLICATIONS

The present application is a Divisional Application of U.S. patent application Ser. No. 17/008,858, Now U.S. patent application No. 11,924,614, filed Sep. 1, 2020, which is a Continuation Application of U.S. patent application Ser. No. 15/670,301, filed Aug. 7, 2017, now U.S. Pat. No. 10,764,696, which is a Continuation Application of U.S. patent application Ser. No. 13/106,335, filed May 12, 2011, now U.S. Pat. No. 9,729,981, naming Koen Van den Heuvel as an inventor. The entire contents of this application are incorporated herein by reference in its entirety.

BACKGROUND

Field of the Invention

The present invention relates generally to hearing prostheses, and more particularly, to hearing prostheses configured to apply mechanical stimulation.

Related Art

Hearing loss, which may be due to many different causes, is generally of two types, conductive and sensorineural. Sensorineural hearing loss is due to the absence or destruction of the hair cells in the cochlea that transduce sound signals into nerve impulses. Various prosthetic hearing implants have been developed to provide individuals who suffer from sensorineural hearing loss with the ability to perceive sound. One such prosthetic hearing implant is referred to as a cochlear implant. Cochlear implants use an electrode array implanted in the cochlea of a recipient to bypass the mechanisms of the ear. More specifically, an electrical stimulus is provided via the electrode array directly to the auditory nerve, thereby causing a hearing sensation.

Conductive hearing loss occurs when the normal mechanical pathways that provide sound to hair cells in the cochlea are impeded, for example, by damage to the ossicular chain or ear canal. However, individuals suffering from conductive hearing loss may retain some form of residual hearing because the hair cells in the cochlea may remain undamaged.

Still other individuals suffer from mixed hearing losses, that is, conductive hearing loss in conjunction with sensorineural hearing. Such individuals may have damage to the outer or middle car, as well as to the inner ear (cochlea).

Individuals suffering from conductive hearing loss are typically not candidates for a cochlear implant due to the irreversible nature of the cochlear implant. Specifically, insertion of the electrode assembly into a recipient's cochlea exposes the recipient to potential destruction of the majority of hair cells within the cochlea. Typically, destruction of the cochlea hair cells results in the loss of residual hearing in the portion of the cochlea in which the electrode assembly is implanted.

Rather, individuals suffering from conductive hearing loss typically receive an acoustic hearing aid, referred to as a hearing aid herein. Hearing aids rely on principles of air conduction to transmit acoustic signals to the cochlea. In particular, a hearing aid typically uses an arrangement positioned in the recipient's car canal or on the outer car to amplify a sound received by the outer car of the recipient. This amplified sound reaches the cochlea causing motion of the perilymph and stimulation of the auditory nerve.

Unfortunately, not all individuals who suffer from conductive hearing loss are able to derive suitable benefit from hearing aids. For example, some individuals are prone to chronic inflammation or infection of the car canal thereby eliminating hearing aids as a potential solution. Other individuals have malformed or absent outer car and/or car canals resulting from a birth defect, or as a result of medical conditions such as Treacher Collins syndrome or Microtia. Furthermore, hearing aids are typically unsuitable for individuals who suffer from single-sided deafness (total hearing loss only in one ear). Hearing aids commonly referred to as "cross aids" have been developed for single sided deaf individuals. These devices receive the sound from the deaf side with one hearing aid and present this signal (either via a direct electrical connection or wirelessly) to a hearing aid which is worn on the opposite side. Unfortunately, this requires the recipient to wear two hearing aids. Additionally, in order to prevent acoustic feedback problems, hearing aids generally require that the car canal be plugged, resulting in unnecessary pressure, discomfort, or other problems such as eczema.

As noted above, hearing aids rely primarily on the principles of air conduction. However, other types of devices commonly referred to as bone conducting hearing aids or bone conduction devices, function by converting a received sound into a mechanical force. This force is transferred through the bones of the skull to the cochlea and causes motion of the cochlea fluid. Hair cells inside the cochlea are responsive to this motion of the cochlea fluid and generate nerve impulses which result in the perception of the received sound. Bone conduction devices have been found suitable to treat a variety of types of hearing loss and may be suitable for individuals who cannot derive sufficient benefit from acoustic hearing aids, cochlear implants, etc, or for individuals who suffer from stuttering problems.

Another type of hearing prosthesis that converts received sound into a mechanical force in treating hearing loss is a direct acoustic cochlear stimulator (DACS) (also sometimes referred to as a "direct mechanical stimulator" or "inner ear mechanical stimulation device"). A DACS comprises an actuator that generates vibrations that are coupled to the inner ear of a recipient and thus bypasses the outer and middle car.

One other type of hearing prosthesis that converts sound into a mechanical force in treating hearing loss is a middle car mechanical stimulation device (also sometimes referred to as a "direct drive middle ear hearing device" or "implantable middle ear hearing device"). Such, stimulation devices comprise an actuator that generates vibrations that are coupled to the middle car of a recipient (e.g., to a bone of the ossicles).

SUMMARY

In one aspect of the present invention, there is provided a method for identifying one or more resonance peaks of an actuator of an auditory prosthesis configured to apply mechanical stimulation to a recipient, the method comprising: providing a signal to the actuator to cause actuation of the actuator; measuring at least one of a voltage across the actuator and a current through the actuator; and analyzing the measured values to identify at least one resonance peak of the actuator.

In another aspect of the present invention, there is provided an auditory prosthesis comprising: an actuator configured to apply mechanical stimulation to a recipient to cause a hearing percept by the recipient; a signal generator configured to provide a signal to the actuator to cause actuation of the actuator, a measurement circuit configured to measure at least one of a voltage across the actuator and a current through the actuator, a control circuit configured analyze the measured values to identify at least one resonance peak of the actuator.

In yet another aspect, there is provided an auditory prosthesis comprising: means for applying mechanical stimulation to a recipient to cause a hearing percept by the recipient; means for providing a signal to the means for applying mechanical stimulation; means for measuring at least one of a voltage across the means for applying mechanical stimulation and a current through the means for applying mechanical stimulation; and means for analyzing the measured values to identify at least one resonance peak of the means for applying mechanical stimulation.

BRIEF DESCRIPTION OF THE DRAWINGS

Embodiments of the present invention are described below with reference to the attached drawings, in which.

DETAILED DESCRIPTION

Embodiments of the present invention are generally directed to an auditory prosthesis comprising an actuator for providing mechanical stimulation to a recipient. The auditory prosthesis further comprises a measurement circuit for use in determining the resonance peak(s) of the actuator. In an embodiment, the measurement circuit measures the voltage drop across the actuator by applying a frequency sweep of the operational frequencies of the actuator. These measured voltages are then analyzed for discontinuities that are indicative of a resonance peak of the actuator. In an embodiment, rather than (or in conjunction with) measuring the voltage drop across the actuator, the measurement circuit measures the current through the actuator across the operational frequency range of the actuator and then analyzes the measured currents for discontinuities indicative of a resonance peak of the actuator.

In another embodiment, rather than using a frequency sweep to measure voltages and/or currents across the actuator, the measurement circuit instead applies a voltage impulse to the actuator and then measure the voltage and/or current across the actuator for a period of time after application of the impulse. The measured voltages and/or currents are then be analyzed in the frequency domain to identify resonance peak(s) of the actuator.

Figure 1:
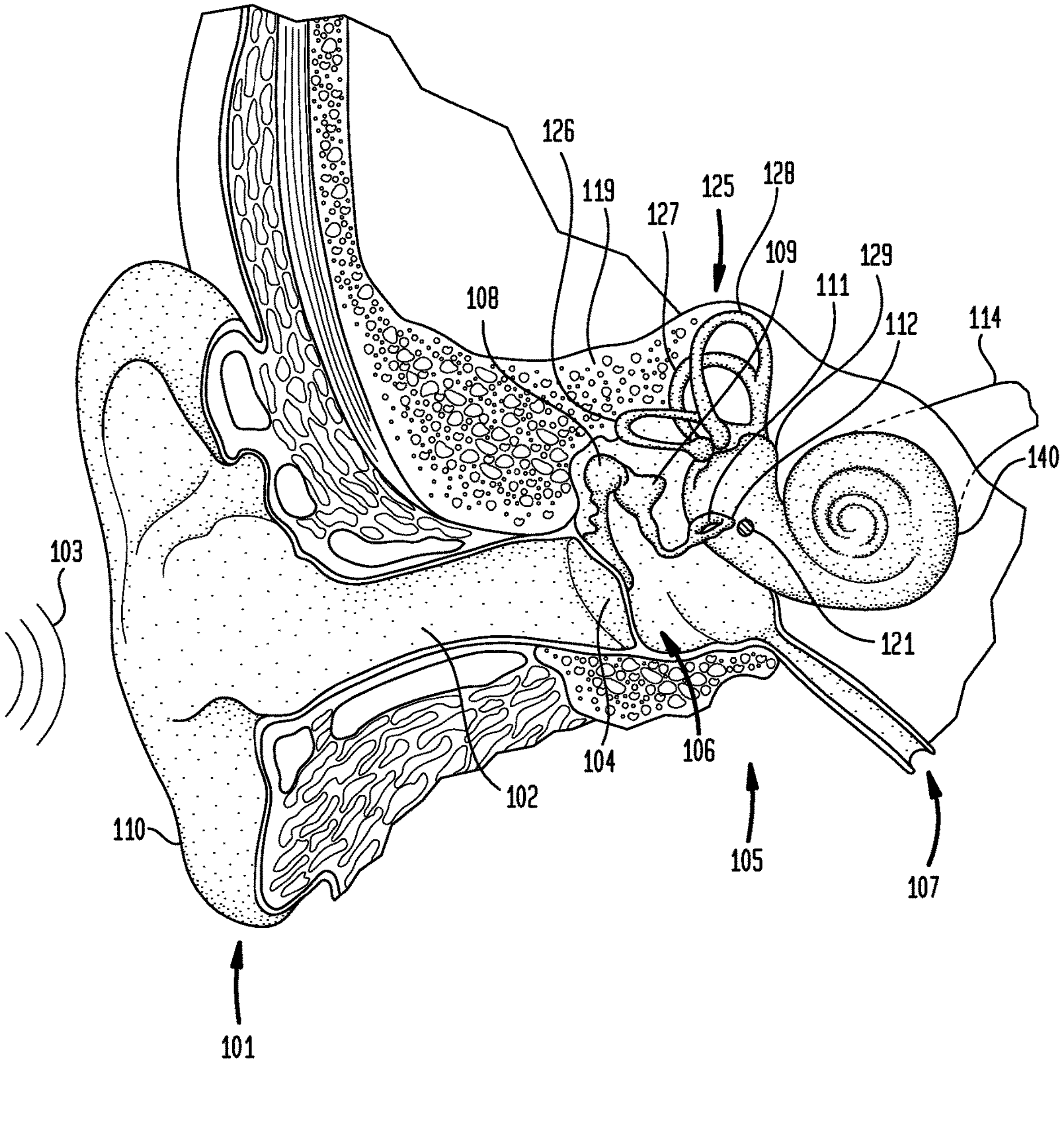
FIG. 1 is perspective view of an individual's head in which an auditory prosthesis in accordance with embodiments of the present invention may be implemented.

FIG. 1 is perspective view of an individual's head in which an auditory prosthesis in accordance with embodiments of the present invention may be implemented. As shown in FIG. 1, the individual's hearing system comprises an outer car 101, a middle car 105 and an inner car 107. In a fully functional car, outer ear 101 comprises an auricle 110 and an car canal 102. An acoustic pressure or sound wave 103 is collected by auricle 110 and channeled into and through car canal 102. Disposed across the distal end of car cannel 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 108, the incus 109 and the stapes 111. Bones 108, 109 and 11 of middle car 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown in FIG. 1 are semicircular canals 125. Semicircular canals 125 are three half-circular, interconnected tubes located adjacent cochlea 140. The three canals are the horizontal semicircular canal 126, the posterior semicircular canal 127, and the superior semicircular canal 128. The canals 126, 127 and 128 are aligned approximately orthogonally to one another. Specifically, horizontal canal 126 is aligned roughly horizontally in the head, while the superior 128 and posterior canals 127 are aligned roughly at a 45 degree angle to a vertical through the center of the individual's head.

Each canal is filled with a fluid called endolymph and contains a motion sensor with tiny hairs (not shown) whose ends are embedded in a gelatinous structure called the cupula (also not shown). As the skull twists in any direction, the endolymph is forced into different sections of the canals. The hairs detect when the endolymph passes thereby, and a signal is then sent to the brain. Using these hair cells, horizontal canal 126 detects horizontal head movements, while the superior 128 and posterior 127 canals detect vertical head movements.

Figure 2A:
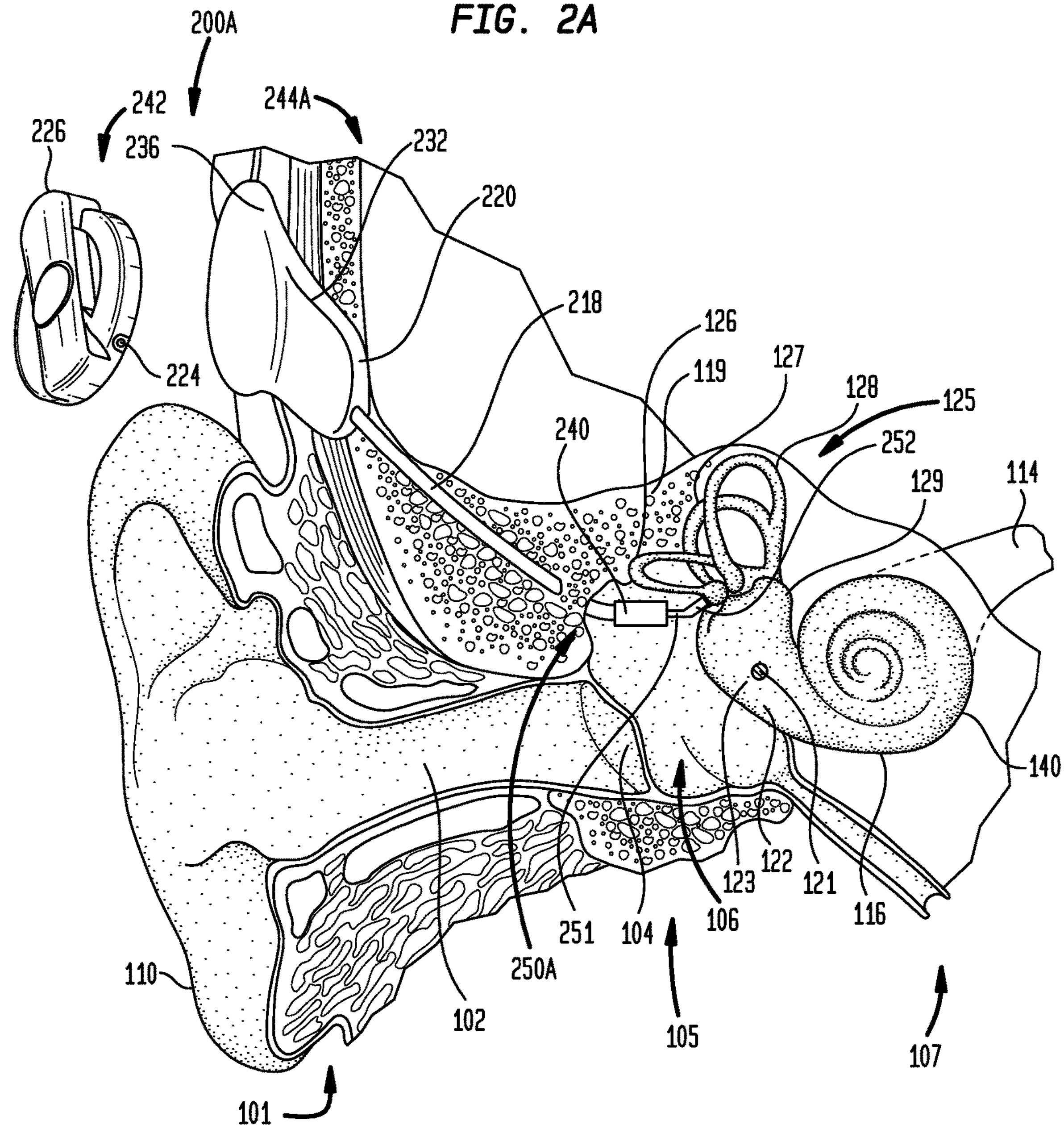
FIG. 2A is a perspective view of an exemplary DACS, in accordance with embodiments of the present invention.

One type of auditory prosthesis that converts sound to mechanical stimulation in treating hearing loss is a direct acoustic cochlear stimulator (DACS) (also sometimes referred to as an "inner ear mechanical stimulation device" or "direct mechanical stimulator"). A DACS generates vibrations that are directly coupled to the inner ear of a recipient and thus bypasses the outer and middle car of the recipient. FIG. 2A is a perspective view of an exemplary DACS 200A in accordance with embodiments of the present invention.

DACS 200A comprises an external component 242 that is directly or indirectly attached to the body of the recipient, and an internal component 244A that is temporarily or permanently implanted in the recipient. External component 242 typically comprises one or more sound input elements, such as microphones 224 for detecting sound, a sound processing unit 226, a power source (not shown), and an external transmitter unit (also not shown). The external transmitter unit is disposed on the exterior surface of sound processing unit 226 and comprises an external coil (not shown). Sound processing unit 226 processes the output of microphones 224 and generates encoded signals, sometimes referred to herein as encoded data signals, which are provided to the external transmitter unit. For ease of illustration, sound processing unit 226 is shown detached from the recipient.

Internal component 244A comprises an internal receiver unit 232, a stimulator unit 220, and a stimulation arrangement 250A. Internal receiver unit 232 and stimulator unit 220 are hermetically sealed within a biocompatible housing, sometimes collectively referred to herein as a stimulator/receiver unit.

Internal receiver unit 232 comprises an internal coil (not shown), and preferably, a magnet (also not shown) fixed relative to the internal coil. The external coil transmits electrical signals (i.e., power and stimulation data) to the internal coil via a radio frequency (RF) link. The internal coil is typically a wire antenna coil comprised of multiple turns of electrically insulated single-strand or multi-strand platinum or gold wire. The electrical insulation of the internal coil is provided by a flexible silicone molding (not shown). In use, implantable receiver unit 132 is positioned in a recess of the temporal bone adjacent auricle 110 of the recipient in the illustrated embodiment.

In the illustrative embodiment, stimulation arrangement 250A is implanted in middle ear 105. For case of illustration, ossicles 106 have been omitted from FIG. 2A. However, it should be appreciated that stimulation arrangement 250A is implanted without disturbing ossicles 106 in the illustrated embodiment.

Stimulation arrangement 250A comprises an actuator 240, a stapes prosthesis 252 and a coupling element 251. In this embodiment, stimulation arrangement 250A is implanted and/or configured such that a portion of stapes prosthesis 252 abuts an opening in one of the semicircular canals 125. For example, in the illustrative embodiment, stapes prosthesis 252 abuts an opening in horizontal semicircular canal 126. It would be appreciated that in alternative embodiments, stimulation arrangement 250A is implanted such that stapes prosthesis 252 abuts an opening in posterior semicircular canal 127 or superior semicircular canal 128.

As noted above, a sound signal is received by one or more microphones 224, processed by sound processing unit 226, and transmitted as encoded data signals to internal receiver 232. Based on these received signals, stimulator unit 220 generates drive signals which cause actuation of actuator 240. This actuation is transferred to stapes prosthesis 252 such that a wave of fluid motion is generated in horizontal semicircular canal 126. Because, vestibule 129 provides fluid communication between the semicircular canals 125 and the median canal, the wave of fluid motion continues into median canal, thereby activating the hair cells of the organ of *Corti*. Activation of the hair cells causes appropriate nerve impulses to be generated and transferred through the spiral ganglion cells (not shown) and auditory nerve 114 to the brain (also not shown) where they are perceived as sound.

Figure 2B:
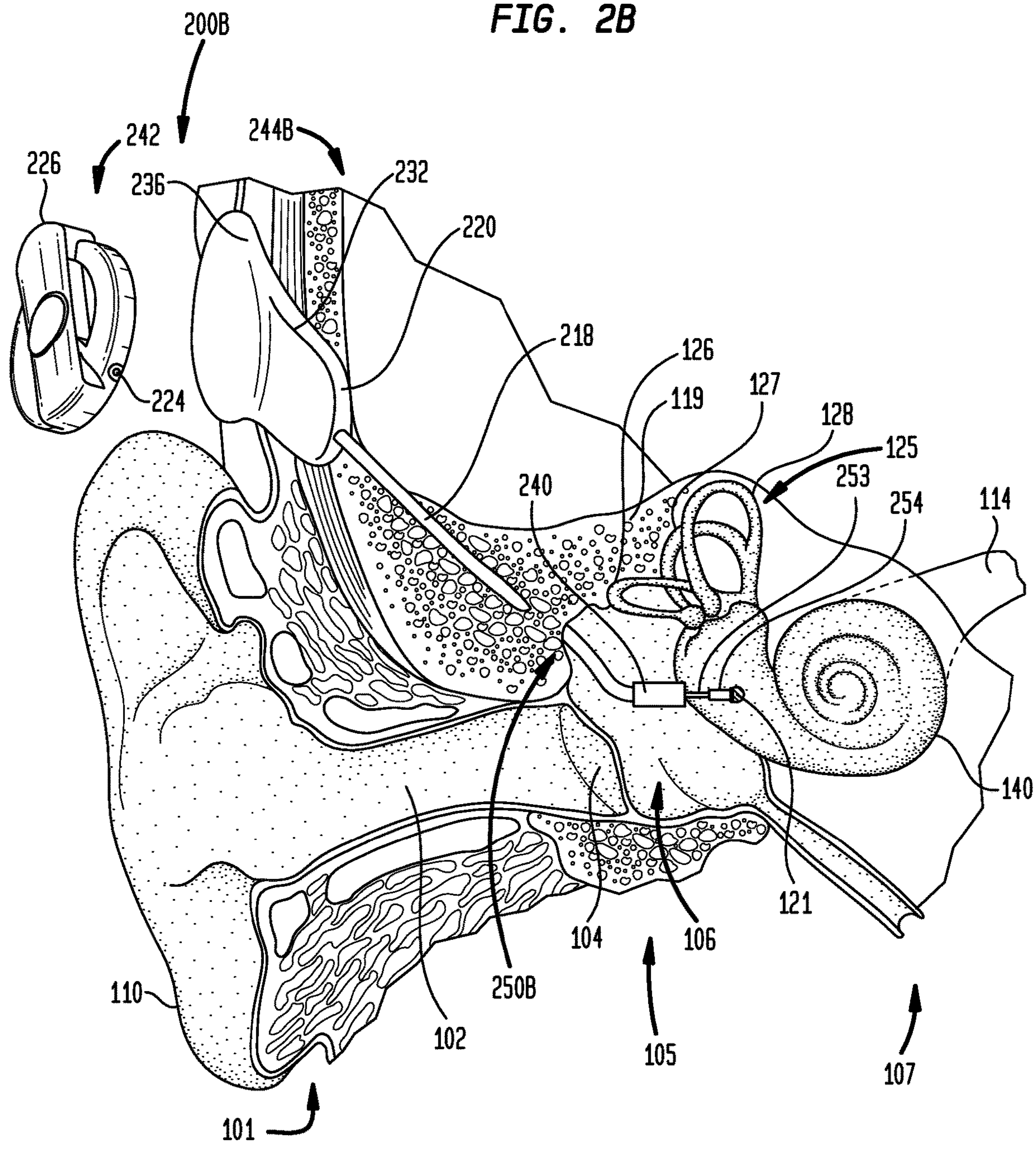
FIG. 2B is a perspective view of another type of DACS, in accordance with an embodiment of the present invention.

FIG. 2B is a perspective view of another type of DACS 200B in accordance with an embodiment of the present invention. DACS 200B comprises an external component 242 which is directly or indirectly attached to the body of the recipient, and an internal component 244B which is temporarily or permanently implanted in the recipient. As described above with reference to FIG. 2A, external component 242 typically comprises one or more sound input elements, such as microphones 224, a sound processing unit 226, a power source (not shown), and an external transmitter unit (also not shown). Also as described above, internal component 244B comprises an internal receiver unit 232, a stimulator unit 220, and a stimulation arrangement 250B.

In the illustrative embodiment, stimulation arrangement 250B is implanted in middle car 105. For case of illustration, ossicles 106 have been omitted from FIG. 2B. However, it should be appreciated that stimulation arrangement 250B is implanted without disturbing ossicles 106 in the illustrated embodiment.

Stimulation arrangement 250B comprises an actuator 240, a stapes prosthesis 254 and a coupling element 253 connecting the actuator to the stapes prosthesis. In this embodiment stimulation arrangement 250B is implanted and/or configured such that a portion of stapes prosthesis 254 abuts round window 121.

As noted above, a sound signal is received by one or more microphones 224, processed by sound processing unit 226, and transmitted as encoded data signals to internal receiver 232. Based on these received signals, stimulator unit 220 generates drive signals which cause actuation of actuator 240. This actuation is transferred to stapes prosthesis 254 such that a wave of fluid motion is generated in the perilymph in scala tympani. Such fluid motion, in turn, activates the hair cells of the organ of *Corti*. Activation of the hair cells causes appropriate nerve impulses to be generated and transferred through the spiral ganglion cells (not shown) and auditory nerve 114 to the brain (also not shown) where they are perceived as sound.

It should be noted that the embodiments of FIGS. 2A and 2B are but two exemplary embodiments of a DACS, and in other embodiments other types of DACs are implemented. Further, although FIGS. 2A and 2B provide illustrative examples of a DACS system, in embodiments a middle car mechanical stimulation device can be configured in a similar manner, with the exception that instead of the actuator 240 being coupled to the inner ear of the recipient, the actuator is coupled to the middle car of the recipient. For example, in an embodiment, the actuator stimulates the middle car by direct mechanical coupling via coupling element to ossicles 106 (FIG. 1), such to incus 109 (FIG. 1).

In determining the drive signals to cause actuation of actuator 240, the resonance peak of the actuator are be taken into account by the stimulator unit 220 in the presently described embodiment. As is known to one of skill in the art, resonance refers to the tendency of a system to oscillate with a larger amplitude at some frequencies than at others. And, a resonance peak refers to frequencies at which a peak in the amplitude occurs.

Figure 3:
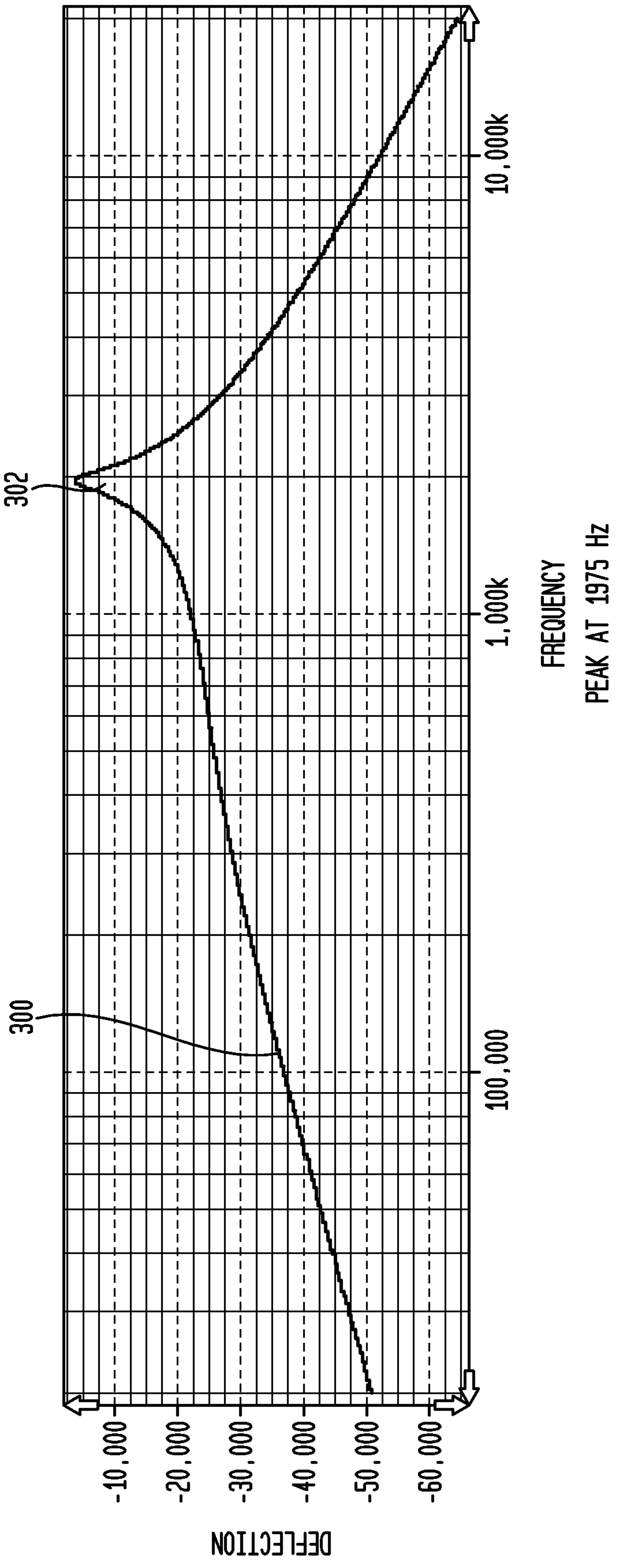
FIG. 3 illustrates a frequency response of an exemplary actuator.

FIG. 3 illustrates a frequency response 300 of an exemplary actuator. As illustrated, the frequency response 300 includes a peak amplitude 302 (in units of Deflection) of 1975 Hz. This frequency response, however, may change over time after implantation of the actuator in the recipient due to, for example, temperature or pressure changes, mechanical aging, a change in the coupling of the actuator with the cochlea (for DACS) or ossicular chain (for middle car mechanical stimulation devices). Thus, even if the frequency response of the actuator is measured prior to implantation in the recipient, the response may change after implantation.

In an embodiment, the auditory prosthesis includes a measurement circuit configured for measuring the frequency response of the actuator after implantation. This frequency response is then used by the stimulator unit in generating the drive signals provided to the actuator in processing received sound and causing a hearing percept by the recipient. For example, in certain embodiments, the actuators have sharp resonance peaks. Measuring the frequency response and determining the resonance peak allows the stimulator unit to compensate for (e.g., using software) the resonance peaks. Depending on the actuator type this compensation may be useful for different reasons. For example, a sharp resonance can cause feedback to occur at that frequency. Further, a sharp resonance can result in the power consumption around that frequency becoming too high. And/or, a sharp resonance can cause sound to become distorted around that frequency since the actuator may start to behave non-linearly. Additionally, a sharp resonance can cause over-stimulation and result in hearing damage if not properly controlled in certain cases.

Figure 4:
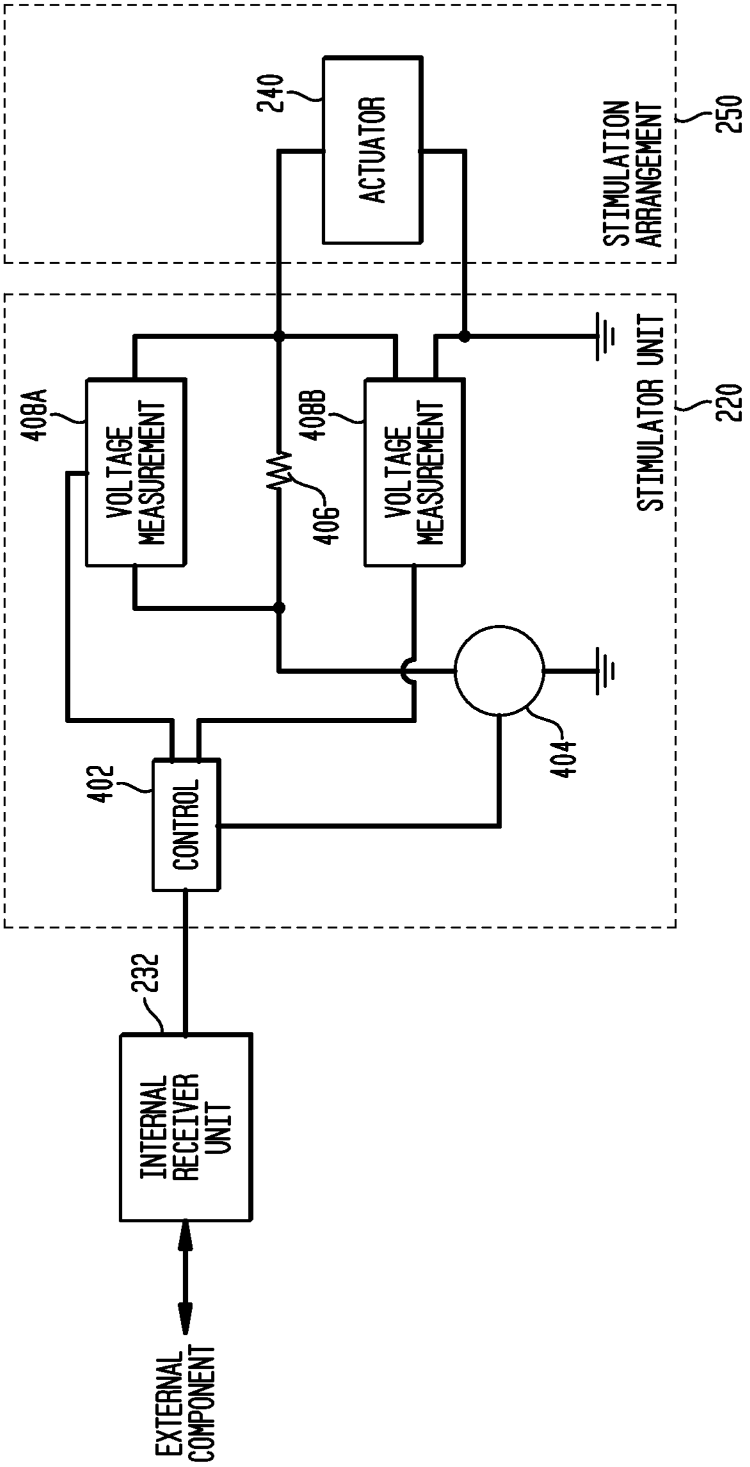
FIG. 4 is a simplified block diagram of an internal component of an exemplary auditory prosthesis including a measurement circuit, in accordance with an embodiment of the present invention.

FIG. 4 is a simplified block diagram of an internal component of an exemplary auditory prosthesis including a measurement circuit, in accordance with an embodiment of the present invention. For ease of explanation, internal receiver unit 232, stimulator unit 220 and stimulation arrangement 250 are labeled with the same numbers as the similarly named and labeled components discussed above with reference to FIGS. 2A and 2B. Further, for simplicity, only those components of the internal component that will be discussed below are illustrated in FIG. 4, and in actual implementation additional components may be included, such as those discussed above with reference to FIGS. 2A and 2B.

As illustrated, stimulator unit 220, includes a control circuit 402, a signal generator 404, a resistor 406, and two voltage measurement circuits 408A and 408B. Control circuit 402 is a circuit (e.g., an Application Specific Integrated Circuit (ASIC)) configured for exercising control over the stimulator unit 220. For example, control circuit 402 is configured for receiving, from the internal receiver unit 232, the encoded data signals regarding the sound and generating the drive signals causing actuation of the actuator 240. As noted above, control circuit 402 takes into account the frequency response and resonant peak(s) of the actuator 240 in determining the drive signals.

Signal generator 404 (also referred to as an actuator driver) generates the drive signals for causing actuation of actuator 240. In an embodiment, signal generator 404 has an output impedance of 10 ohms. Signal generator 404, in an embodiment, is, for example, a Class D or E amplifier containing means to switch the signal generator output or place the signal generator in a high impedance state. Resistor 406 is be a standard resistor, such as, for example, a 2.3-ohm resistor in the presently described embodiment; however, in other embodiments resistor 406 may be other types of resistive elements.

A voltage measurement circuit 408A is illustrated as connected to opposite ends of resistor 406. Voltage measurement circuit 408A may include any type of circuitry configured to output a signal indicative of the voltage across resistor 406. For example, in an embodiment, voltage measurement circuit 408A comprises a differential amplifier that takes as inputs the signals on opposite sides of resistor 406 and then amplifies the difference in the voltage between the two sides. As illustrated, voltage measurement circuit 408A provides the measured voltage to control circuit 402. Further, in embodiments, voltage measurement circuit 408A comprises an analog to digital converter (ADC) that digitizes the measured voltage before providing the measured voltage to the control circuit 402.

Actuator 240 can be any type of device suitable for generating mechanical movement. For example, in an embodiment, actuator 240 comprises a transducer element having a magnetic coil or a piezoelectric element. Actuator 240 is implemented as a Microelectromechanical System (MEMS) structure (e.g., a comb-drive MEMS) in an embodiment. A voltage measurement circuit 408B is illustrated as connected on opposite sides of actuator 240. As configured, voltage measurement circuit 408B measures the voltage drop across actuator 240. Voltage measurement circuit 408B, in the presently described embodiment, includes circuitry such as discussed above with reference to voltage measurement circuit 408A for measuring and outputting the measured voltage. As illustrated, voltage measurement circuit 408B provides the measured voltage to control circuit 402. Although the illustrated embodiment includes two voltage measurement circuits 408A and 408B, in other embodiments only one of the voltage measurement circuits is included.

Figure 5:
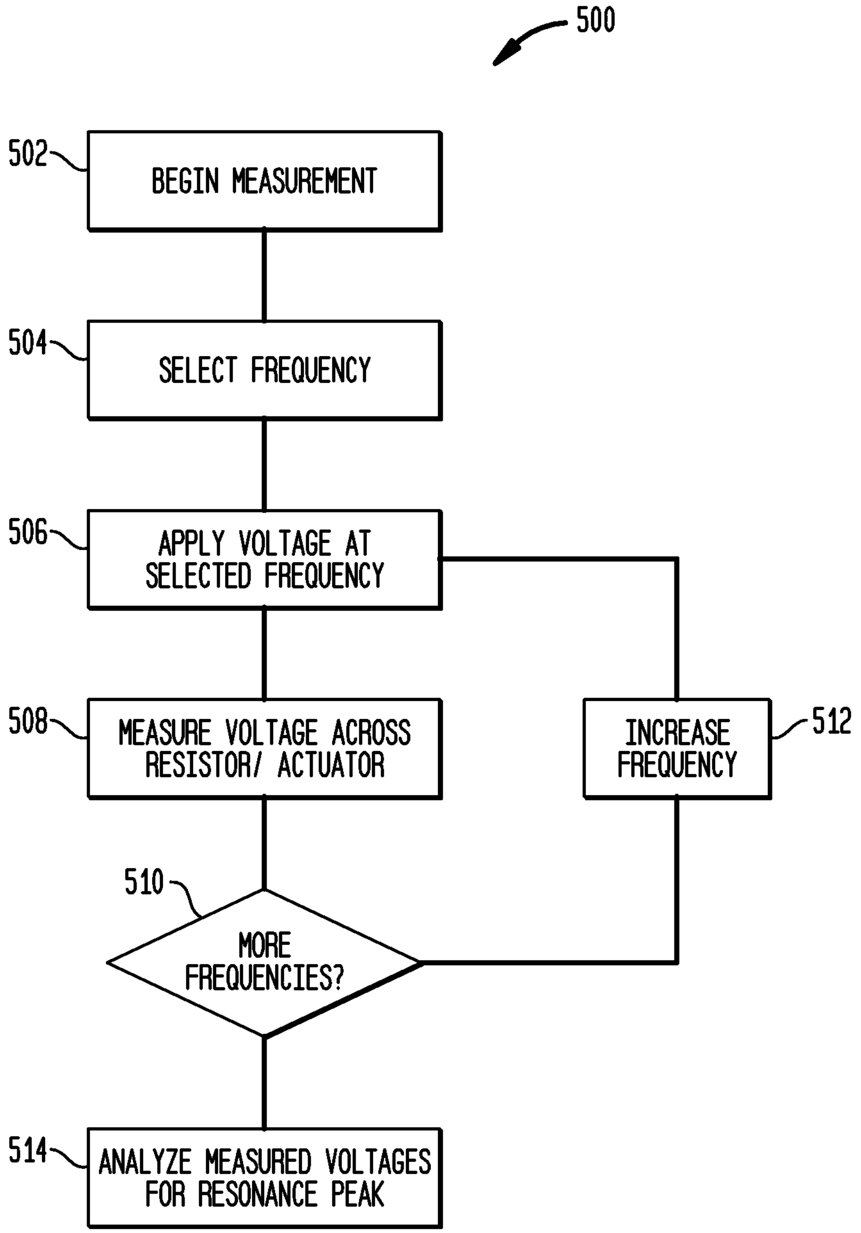
FIG. 5 provides a flow chart of an exemplary method for determining the resonance peak(s) of an actuator, in accordance with an embodiment of the present invention.

FIG. 5 provides a flow chart of an exemplary method for determining the resonance peak(s) of an actuator, in accordance with an embodiment of the present invention. Flow chart 500 will be described with reference to the above-discussed FIG. 4.

Control circuit 402, at block 502, determines to initiate the process for determining the resonance peak(s) of actuator 240. For example, in an embodiment, control circuit 402 determines to initiate the process based on an amount of time that has elapsed since the last measurement (e.g., the control circuit 402 performs measurements once a day, week, month, etc.). Or, for example, in an embodiment, a clinician connects to the sound processing unit 226 (FIGS. 2A and 2B) and direct sound processing unit 226 to send a command to the stimulator unit 220 that directs control circuit 402 to initiate the process. Or, for example, control circuit 402, in an embodiment, monitors performance of the stimulator unit 220 and/or actuator 240 and initiate the process if a particular event occurs.

In the presently described embodiment, the control circuit 402 directs the signal generator 404 to apply a frequency sweep at a voltage of 0.5 volts between 50 and 20 kHz and take measurements at 200 logarithmic steps along the frequency sweep. Blocks 506-510 illustrate a simplified method of applying a frequency sweep and performing measurements. It should, however, be understood that other mechanisms for applying a frequency sweep and obtaining measurements may be used. Further, the voltages, number of measurements and frequency range of the sweep are exemplary only, and in other embodiments different values may be used.

At block 504, control circuit 402 selects the starting frequency (e.g., 50 Hz) and voltage for the sweep (e.g., 0.5 V) and directs signal generator 404 to begin the frequency sweep. At block 506, signal generator 404 then begins the frequency sweep by providing a signal at the specified frequency and voltage to actuator 240.

As noted above, resistor 406 is in series with signal generator 402 and actuator 240. At block 508, voltage measurement circuit 408A measures the voltage drop across resistor 406 and voltage measurement circuit 408B measures the voltage drop across actuator 240. As noted above, voltage measurement circuits 408A and 418B each comprise a differential amplifier that amplifies the difference in voltage across resistor 406 and actuator 240, respectively. Voltage measurement circuits 408A and 408B provide this measured voltages to control circuit 402.

Next, control circuit 402 determines if the frequency sweep is completed or not at decision 510. If not, control circuit 402 increases the frequency of signal generator 404 at block 512. As noted above, in an embodiment, the frequency sweep ranges from 50 to 20 kHz, with the control circuit taking 200 measurements logarithmically spaced between 50 and 20 kHz. Thus, in an embodiment, control circuit 402 directs the signal generator 404 to apply a signal at the next frequency (e.g., 51.5 Hz, 53.1 Hz, . . . 19409.8 Hz, 20 kHz) for which the control circuit 402 is to obtain a measurement.

Once the frequency sweep is completed and the measurements obtained, the control circuit 402 analyzes the measured voltages, at block 514, to identify where the resonance peak(s) is located. Control circuit 402 analyzes the measured voltages for discontinuities indicative of a resonance peak in the presently described embodiment.

In the illustrated embodiment, control circuit 402 convert the voltage across resistor 406 to a current value indicative of the current passing through actuator 240. As noted above, resistor 406, in an embodiment, is a 2.3 ohm resistor. Using the formula I=V/R, control circuit 402 converts measured voltage to a current value by simply dividing the measured voltage by 2.3 in the presently described embodiment.

Figure 6:
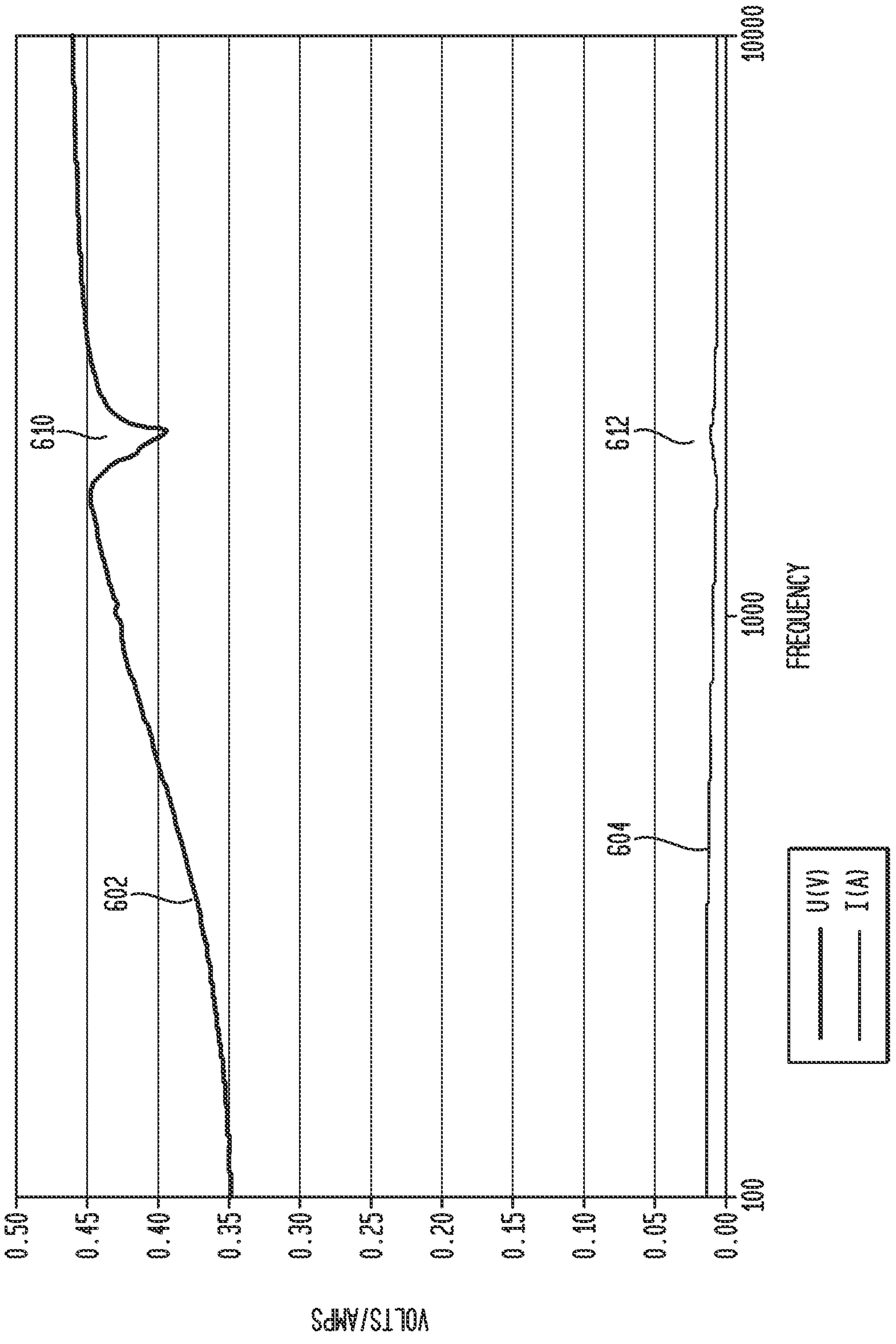
FIG. 6 illustrates an exemplary voltage curve for a voltage measured across am actuator for a frequency sweep, in accordance with an embodiment of the present invention.

FIG. 6 illustrates an exemplary voltage curve 602 for a voltage measured across actuator 240 for a frequency sweep, such as discussed above. As illustrated, curve 602 comprises a discontinuity 610 where the voltage drops more readily before returning to a move smooth curve shape. This discontinuity 610 is indicative of a resonance peak in the actuator at approximately 1750 Hz. Also, illustrated is a current curve 604 for the current measured through resistor 406.

Current curve 604 similarly includes a discontinuity 612 at the resonance peak of actuator 240 evidenced by the increase in the current at approximately 1750 Hz before falling back to a more smooth curve shape. Although due to the scale of the current curve, the discontinuity 612 is not as readily visible as discontinuity 610, either the voltage curve 602 or current curve 604 may be analyzed in embodiments for discontinuities indicative of the resonance peak of the actuator.

In FIG. 6, discontinuity 612 illustrates a large drop in voltage (a local minima). A drop in voltage (local minima) is indicative of a series resonance peak. Although not as clearly illustrated, curve 604 also includes an increase in voltage (local maxima) indicative of a parallel resonance peak. This parallel resonance peak occurs, for example, just before or after, the series resonance peak. In an embodiment, control circuit 402 identifies one or more or all of these resonance peaks.

As noted above, in another embodiment, rather than measuring both the voltage across actuator 240 and the current through resistor 406, only one of the voltage across actuator 240 or current through actuator 240 is measured. Then, whichever parameter is measured is analyzed to identify the resonance peak. For example, in an embodiment, resistor 406 is not be included and instead the voltage across actuator 240 is measured and analyzed to identify the resonance peak(s).

Figure 7:
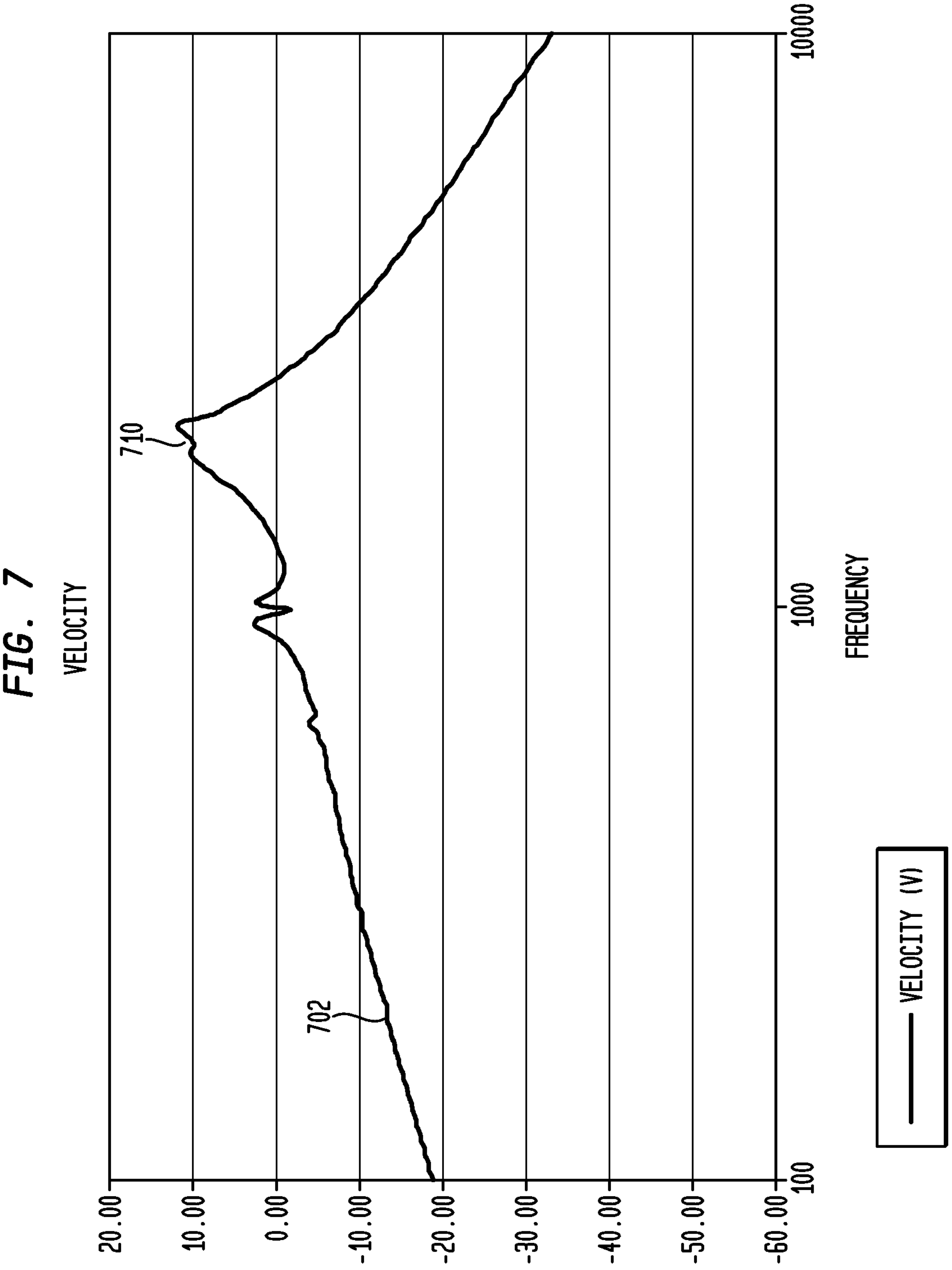
FIG. 7 illustrates an exemplary velocity curve in micrometers/sec versus frequency for an actuator, in accordance with an embodiment of the present invention.

FIG. 7 illustrates an exemplary velocity curve 702 in micrometers/sec versus frequency for actuator 240. This curve 702 was measured prior to implantation of actuator 240 using a Polytech laser Doppler vibrometer (LDV). As illustrated, curve 704 shows that actuator 240 has a resonance peak 710 at approximately 1750 Hz. This measured resonance peak corresponds to the resonance peak identified by discontinuity 610 of FIG. 6 measured using the circuit illustrated in FIG. 4.

There are a plurality of mechanisms that control circuit 402 may use in locating discontinuities in the measured voltage and/or current that correspond to resonance peaks. For example, control circuit 402 may transmit the voltage and/or current versus frequency values, via internal receiver unit 232, to the external component 242 that provides the values to an external device (e.g., a computer connected to the sound processing unit 226 of the external component 242) that plots the values. These plotted values are displayed via the external computer to and audiologist that examines the curve(s) and identifies the resonance peaks in an embodiment. The audiologist then provides (via the computer, external component 252 and internal receiver unit 232) the identified resonance peaks to the control circuit 402, which may then use the identified peaks in providing stimulation the recipient in the embodiment. Or, for example, in an embodiment, the control circuit 402 identifies the resonance peaks itself using software and/or hardware to examine the values for discontinuities. For example, the control circuit 402 identifies local maxima in the measured values in the embodiment. The control circuit 402 then determines that the identified local maxima are due to a resonance peak if the local maxima differs from a curve fit to the measured values by more than a specified threshold in the embodiment.

After obtaining measured values in accordance with the above techniques, in embodiments, control circuit 402 may identify resonance peak(s) from the measured values using techniques other than the above-discussed example of identifying resonance peaks by locating discontinuities. For example, in an embodiment, control circuit 402 divides the instantaneous voltage across actuator 240 by the instantaneous current through actuator 240 and then examine the phase difference of the instantaneous values. Control circuit 402 then identifies resonance peaks for frequencies in which the phase difference is 0.

In another embodiment, rather than control circuit 402 directing signal generator 404 to apply a frequency sweep to measure voltages at a plurality of different frequencies, control circuit 402 directs signal generator to apply one or a plurality of impulses and then measure the voltage(s) after application of the impulse(s).

Figure 8A:
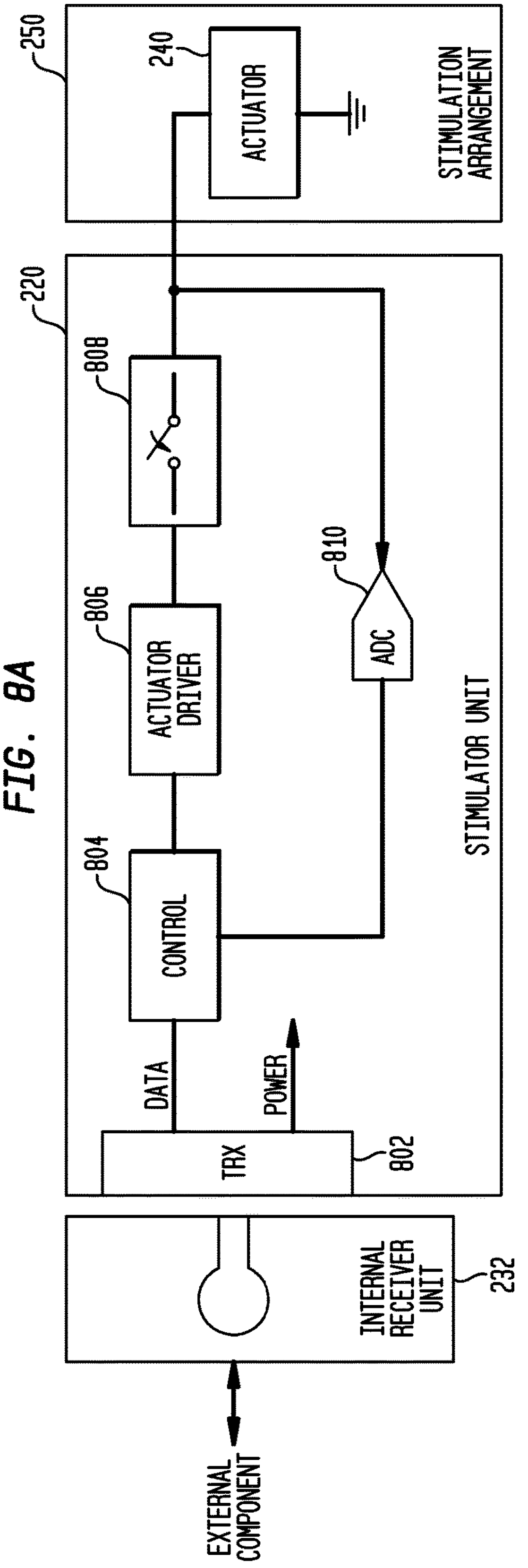
FIG. 8A is a simplified block diagram of an internal component of an exemplary auditory prosthesis including a measurement circuit, in accordance with an embodiment of the present invention.

FIG. 8A is a simplified block diagram of an internal component of an exemplary auditory prosthesis including a measurement circuit, in accordance with an embodiment of the present invention. For ease of explanation, internal receiver unit 232, stimulator unit 220 and stimulation arrangement 250 are labeled with the same numbers as the similarly named and labeled components discussed above with reference to FIGS. 2A and 2B. Further, for simplicity, only those components of the internal component that will be discussed below are illustrated in FIG. 8A, and in actual implementation additional components may be included, such as those discussed above with reference to FIGS. 2A and 2B.

As illustrated, stimulator unit 220 comprises a transceiver 802, a control circuit 804, an actuator driver (also referred to as a signal generator) 806, a switch 808, and an analog to digital converter (ADC) 810. Transceiver 802 is configured to separate the data and power from the received signal from internal receiver unit 232 in an embodiment. Transceiver provides the data to control circuit 804 and provides the power to a power circuit (not shown) configured to power the stimulator unit 220. Although not illustrated in FIG. 4, it should be understood that the embodiment of FIG. 4 may similarly include a transceiver circuit configured to separate power and data from the incoming signal.

Control circuit 804 (also referred to herein as a signal processing circuit) is a circuit (e.g., an Application Specific Integrated Circuit (ASIC)) configured for exercising control over the stimulator unit 220 in the presently described embodiment. For example, control circuit 804 is configured for receiving, from the internal receiver unit 232, the encoded data signals regarding the sound and generating the drive signals causing actuation of the actuator 240 in the presently described embodiment. As noted above, control circuit 804 takes into account the frequency response and resonant peak(s) of the actuator 240 in determining the drive signals for actuator 240.

Figure 8B:
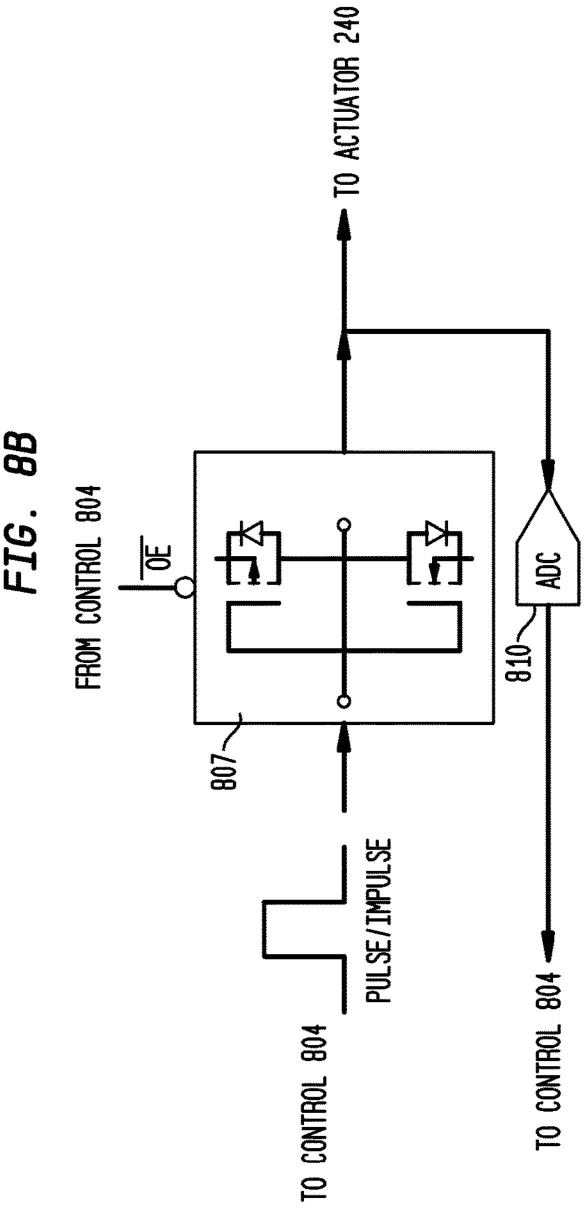
FIG. 8B illustrates an exemplary Class D amplifier (PWM/PDM) interface with push-pull that can be placed in a high-impedance state, in accordance with an embodiment of the present invention.

Actuator driver 806 generates the drive signals for causing actuation of actuator 240. In an embodiment, actuator driver 806 has an output impedance of 10 ohms. Switch 808 is configured to switch on/off the output of the actuator driver output 806 or place the driver 806 in a high-impedance state. Although illustrated for explanatory purposes as a separate entity, switch 808 can be included in actuator driver 806. For example, actuator driver 806 may be a Class D or E amplifier containing means to switch the signal generator output or place the signal generator in a high impedance state. FIG. 8B illustrates an exemplary Class D amplifier (PWM/PDM) interface 807 with push-pull that can be placed in high-impedance state by the OE pin (output enable). The push-pull can be made of paired N and P Mosfets.

Figure 9:
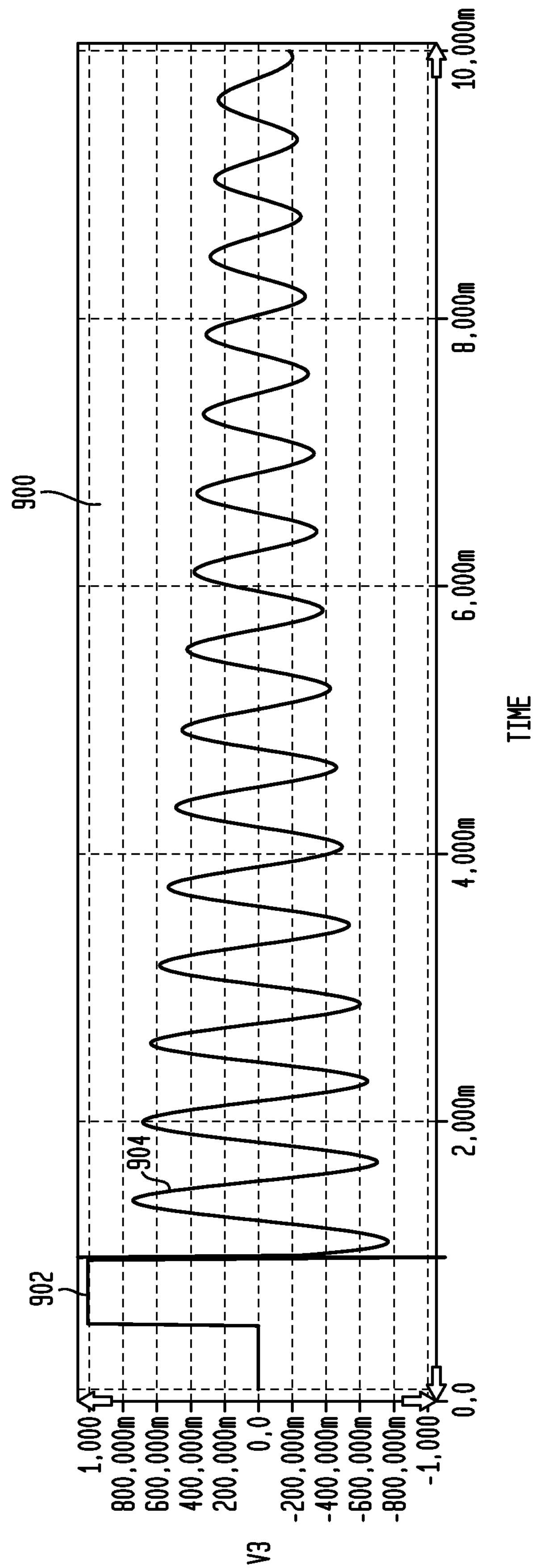
FIG. 9 illustrates an exemplary voltage versus time plot for application of a single impulse, in accordance with an embodiment of the invention.
Figure 10:
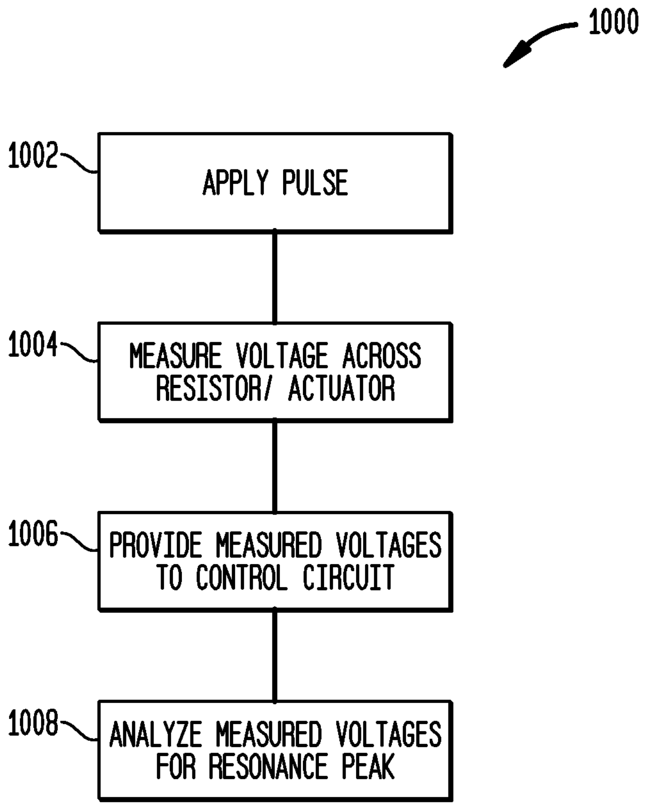
FIG. 10 provides an exemplary flow 900 for determining the resonance peak(s) using an impulse, in accordance with an embodiment of the present invention.

FIG. 9 illustrates an exemplary voltage versus time plot 900 for application of a single impulse, in accordance with an embodiment of the invention. FIG. 10 provides an exemplary flow chart 900 for determining the resonance peak(s) using an impulse, in accordance with an embodiment of the present invention. FIGS. 9-10 will be discussed with regard to the above-discussed FIG. 8A.

At block 1002, control circuit 904 directs signal generator 404 to apply a single impulse. Plot 800 illustrates an exemplary a single 1 volt 500 microsecond impulse 902 provided by actuator driver 806. Then after application of the impulse 902, switch 808 opens thus terminating the signal from actuator driver 806 and, for example, placing actuator driver 806 in a high impedance state. ADC 908 then digitizes the voltage input to actuator 240 at block 1004. This provides a measure of the voltage across actuator 240. In another embodiment, a resistor, such as used in the embodiment of FIG. 4 is used to measure a current through actuator 240.

ADC 808 provides the measured voltage 904 to control circuit 806 at block 1006. In this example, the measured voltage 904 is a deformed sinusoid with a decreasing amplitude. Control circuit 402 then, at block 1008, converts the measured voltage from the time domain to the frequency domain using, for example, a Fast Fourier Transform (FFT).

Figure 11:
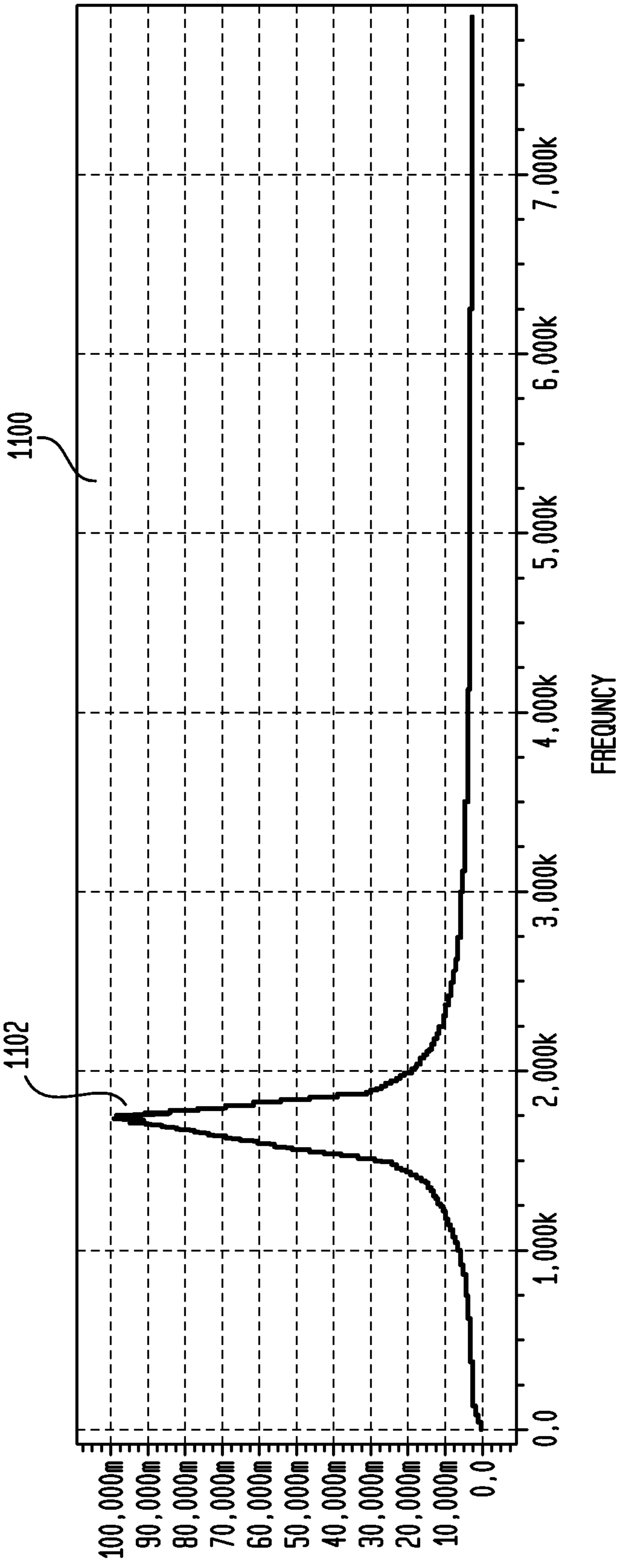
FIG. 11 illustrates an exemplary frequency response of the measured voltage of FIG. 8, in accordance with an embodiment of the present invention.

FIG. 11 illustrates an exemplary frequency spectrum 1100 of the measured voltage 904 of FIG. 9. As illustrated, frequency spectrum 1100 includes a single peak located at approximately 1750 Hz. Control circuit 804, at block 1010, analyzes the frequency spectrum 1100 to identify the local maxima (e.g. peak 102) of the frequency spectrum. These local maxima (e.g., peak 1002) are determined to be the resonance peak(s) of actuator 240. As with the above discussed example, control circuit 804 determines that a local maxima is a resonance peak if the local maxima has a value greater than a specified threshold to reduce the likelihood of errors due to noise in the system. Control circuit 804 then uses the identified resonance peaks in providing stimulation to the recipient. It should be noted that this is but one example control circuit 804 may use to analyze measured voltages to identify the resonance peaks, and in other embodiments other mechanisms may be used.

Figure 12:
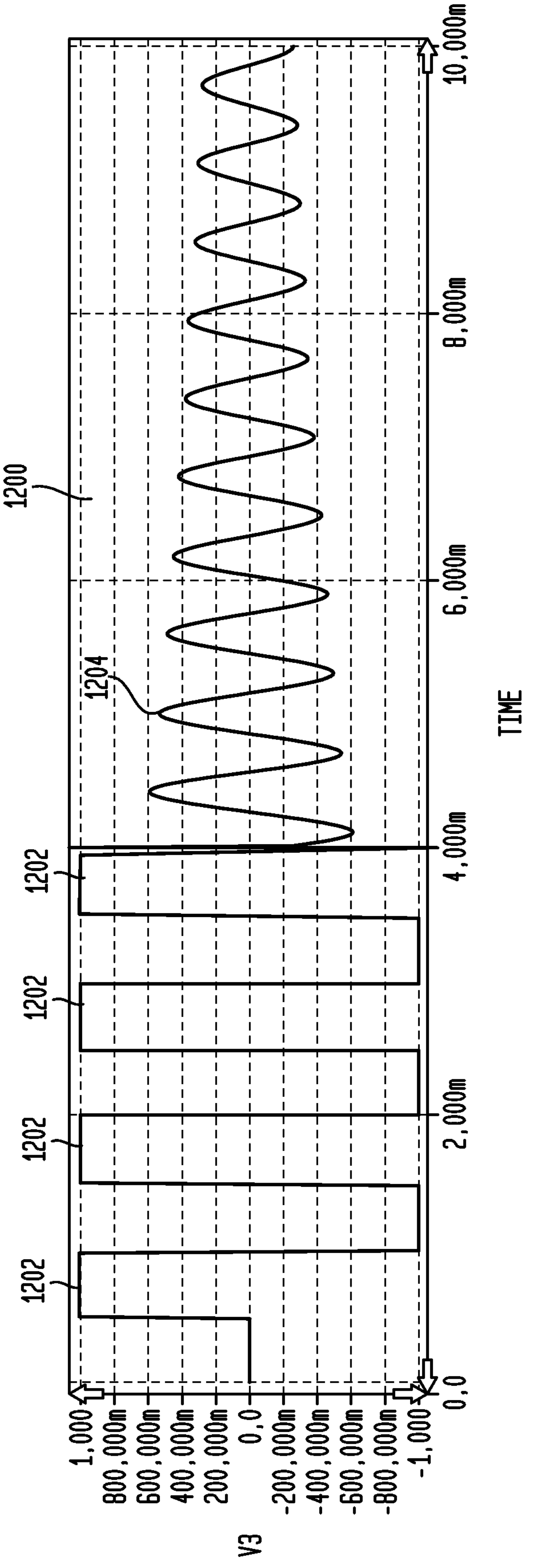
FIG. 12 provides an exemplary voltage versus time plot for application of impulses, in accordance with an embodiment of the invention.

Although in the above-discussed example, a single impulse was used, in other embodiments multiple impulses may be used. FIG. 12 provides an exemplary voltage versus time plot 1200 for application of 4 impulses 1202 each of 500 microseconds, in accordance with an embodiment of the invention. As illustrated, the frequency of the sinusoid for the subsequently measured voltages 1204 is the same as that of FIG. 9. As such, this implementation will have a frequency response similar to frequency response 1100 having a peak of approximately 1750 Hz. Further, it should be understood that other types of measurement circuits may be used in place of the circuit of FIG. 8 in identifying resonance peaks using the above discussed impulse methodology. For example, a circuit similar to that of FIG. 4 may be used.

Figure 13:
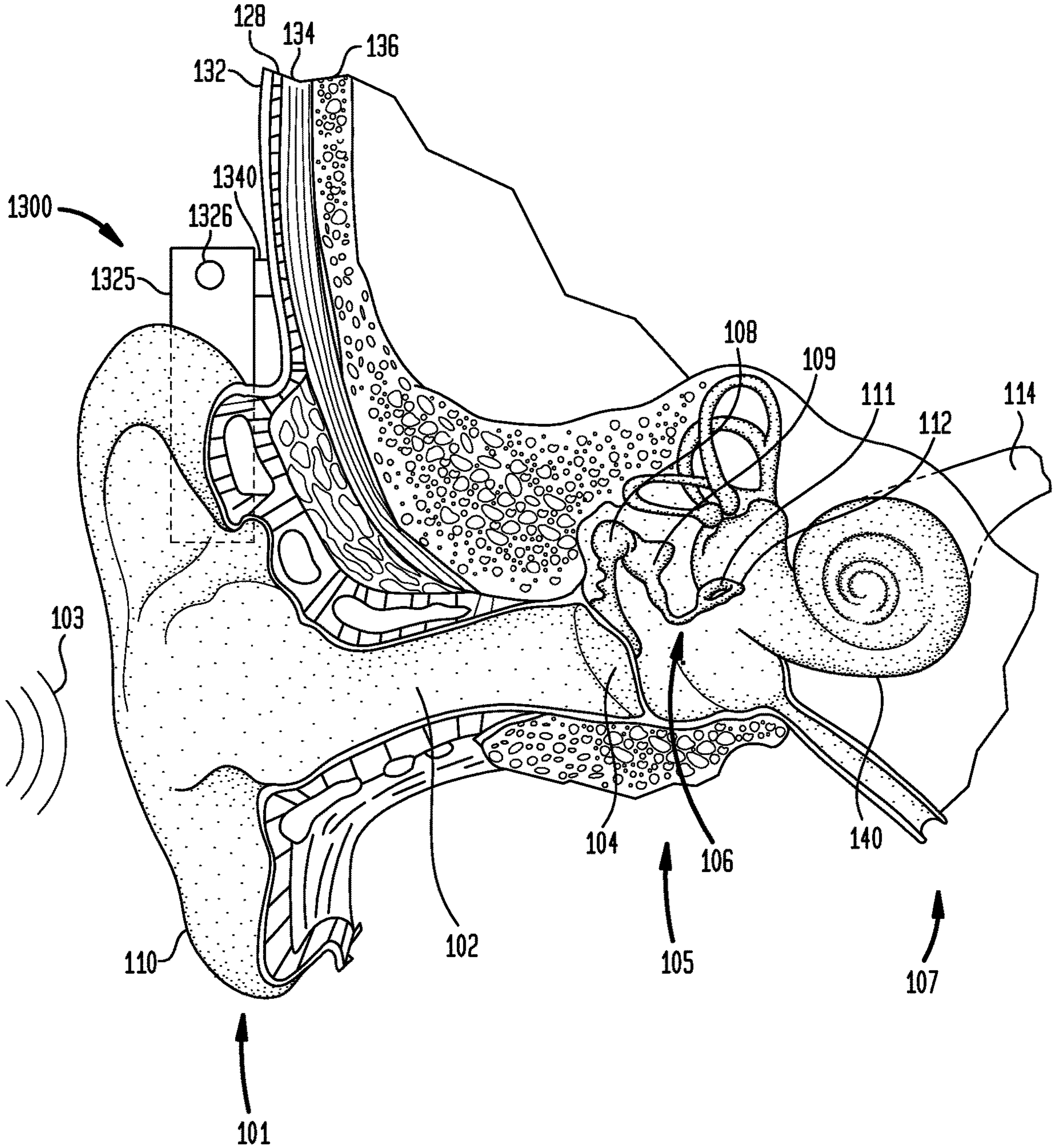
FIG. 13 is a perspective view of a bone conduction device in which embodiments of the present invention may be advantageously implemented.

As noted above, embodiments of the present invention may also be used with other auditory prostheses. One other type of such auditory prosthesis that converts sound to mechanical stimulation in treating hearing loss is a bone conduction device. FIG. 13 is a perspective view of a bone conduction device 1300 in which embodiments of the present invention may be advantageously implemented. For case of explanation, the portions of a recipient's outer ear 101, middle car 105 and inner ear 107 are labeled with the same labels as used in FIG. 1. As will be discussed further below, bone conduction device 1300 converts a received sound signal into a mechanical force that is delivered to the recipient's skull.

FIG. 13 also illustrates the positioning of bone conduction device 1300 relative to outer car 101, middle car 105 and inner ear 107 of a recipient of device 1300. As shown, bone conduction device 1300 is positioned behind outer car 101 of the recipient. In the embodiment illustrated in FIG. 13, bone conduction device 1300 comprises a housing 1325 having a sound input element 1326 positioned in, on or coupled to housing 1325. Sound input element 1326 is configured to receive sound signals and may comprise, for example, a microphone, telecoil, etc.

Bone conduction device 1300 comprises a sound processor, an actuator and/or various other electronic circuits/devices that facilitate operation of the device in the presently described embodiment. In an embodiment, the actuator is a piezoelectric actuator; however, in other embodiments, actuator can be any other suitable type actuator. Actuators are sometimes referred to as vibrators. Bone conduction device 1300 also comprises actuator drive components configured to generate and apply an electric field to the actuator. In certain embodiments, the actuator drive components comprise one or more linear amplifiers. For example, class D amplifiers or class G amplifiers may be utilized, in certain circumstances, with one or more passive filters. More particularly, sound signals are received by sound input element 1326 and converted to electrical signals. The electrical signals are processed and provided to the actuator that outputs a force for delivery to the recipient's skull to cause a hearing percept by the recipient.

Bone conduction device 1300 further includes a coupling 1340 configured to attach the device to the recipient. In the specific embodiments of FIG. 13, coupling 1340 is attached to an anchor system (not shown) implanted in the recipient. In the illustrative arrangement of FIG. 13, anchor system comprises a percutaneous abutment fixed to the recipient's skull bone 136. The abutment extends from bone 136 through muscle 134, fat 128 and skin 132 so that coupling 1340 can be attached thereto. Such a percutaneous abutment provides an attachment location for coupling 1340 that facilitates efficient transmission of mechanical force. One type of bone conduction device is a BAHA, which is a registered trademark of Cochlear Bone Anchored Solutions AB (previously Entific Medical Systems AB) in Göteborg, Sweden.

As noted, a bone conduction device, such as bone conduction device 1300, utilizes an actuator (also sometimes referred to as a vibrator) to generate a mechanical force for transmission to the recipient's skull. As with the above described DACs system, the bone conduction device 1300 uses the resonance peak(s) of the device in generating drive signals for generating the stimulation to be applied to the recipient in the presently described embodiment.

Figure 14:
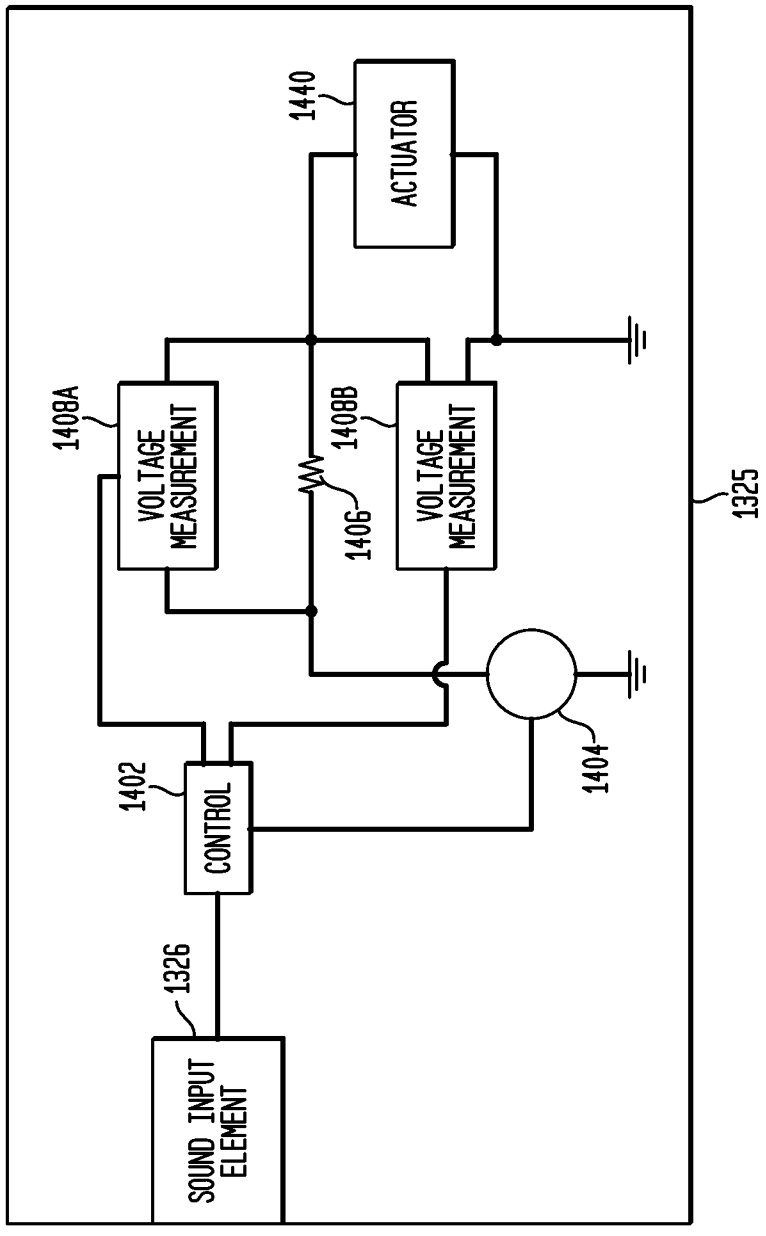
FIG. 14 is a simplified block diagram of an internal component of an exemplary auditory prosthesis including a measurement circuit, in accordance with an embodiment of the present invention.

In an embodiment, bone conduction device 1300 comprises an arrangement similar to the above-discussed arrangement of FIG. 4 for measuring the resonance peaks of the bone conduction device's actuator. FIG. 14 is a simplified block diagram of an internal component of an exemplary auditory prosthesis including a measurement circuit, in accordance with an embodiment of the present invention. For case of explanation, only those components of the bone conduction device that will be discussed below are illustrated in FIG. 14, and in actual implementation additional components may be included, such as actuator drive components, etc.

As illustrated, housing 1325 includes a sound input element 1326, a control circuit 1402, a signal generator 1404, a resistor 1406, two voltage measurement circuits 1408A and 1408B, and an actuator 1440. Control circuit 1402 is a circuit (e.g., an Application Specific Integrated Circuit (ASIC)) configured for exercising control over the bone conduction device. For example, control circuit 1402 is configured for receiving, from the sound input element 1326, the sound signals and processing the sound signals to generate control signals for controlling signal generator in generating drive signals causing actuation of the actuator 1440 in the presently described embodiment. Control circuit 1402 takes into account the frequency response and resonant peak(s) of the actuator 1440 in determining the drive signals in the presently described embodiment.

Signal generator 1404, as noted above, generates the drive signals for causing actuation of actuator 1440. In an embodiment, signal generator 1404 has an output impedance of 10 ohms in the presently described embodiment. In an embodiment, resistor 1406 is a standard resistor, such as, for example, a 2.3-ohm resistor. However, in other embodiments, resistor 1406 is other types of resistive elements. A voltage measurement circuit 1408A is illustrated as connected to opposite ends of resistor 1406. Voltage measurement circuit 1408A can include any type of circuitry configured to output a signal indicative of the voltage across resistor 1406, such as that discussed above with reference to FIG. 4. As illustrated, voltage measurement circuit 1408A provides the measured voltage to control circuit 1402.

In embodiments, actuator 1440 is any type of suitable transducer configured to receive electrical signals and generate mechanical motion in response to the electrical signals. For example, in an embodiment, actuator 1440 is an electromagnetic actuator. A voltage measurement circuit 1408B is illustrated as connected on opposite sides of actuator 1440. As configured, voltage measurement circuit 1408B measures the voltage drop across actuator 1440. Voltage measurement circuit 1408B, in an embodiment, includes circuitry such as discussed above with reference to voltage measurement circuit 1408A for measuring and outputting the measured voltage. As illustrated, voltage measurement circuit 1408B provides the measured voltage to control circuit 1402. Although the illustrated embodiment includes two voltage measurement circuits 1408A and 1408B, in other embodiments only one of the voltage measurement circuits is included.

Control circuit 1402, signal generator 1404, and voltage measurement circuits 1408A and 1408B operate in a similar manner, in the presently described embodiment, to the similarly named components discussed above with reference to FIG. 4 in identifying the resonance peaks of actuator 1440. For example, the illustrated system, in an embodiment, uses a frequency sweep methodology, such as discussed above with reference to FIG. 5, or, for example, in another embodiment, the illustrated system uses an impulse methodology, such as discussed above with reference to FIG. 10. In a system implementing an impulse methodology such as discussed above with reference to FIG. 10, the measurement circuit of FIG. 14, in an embodiment, is replaced with a measurement circuit similar to that discussed above with reference to FIG. 8.

Figure 15:
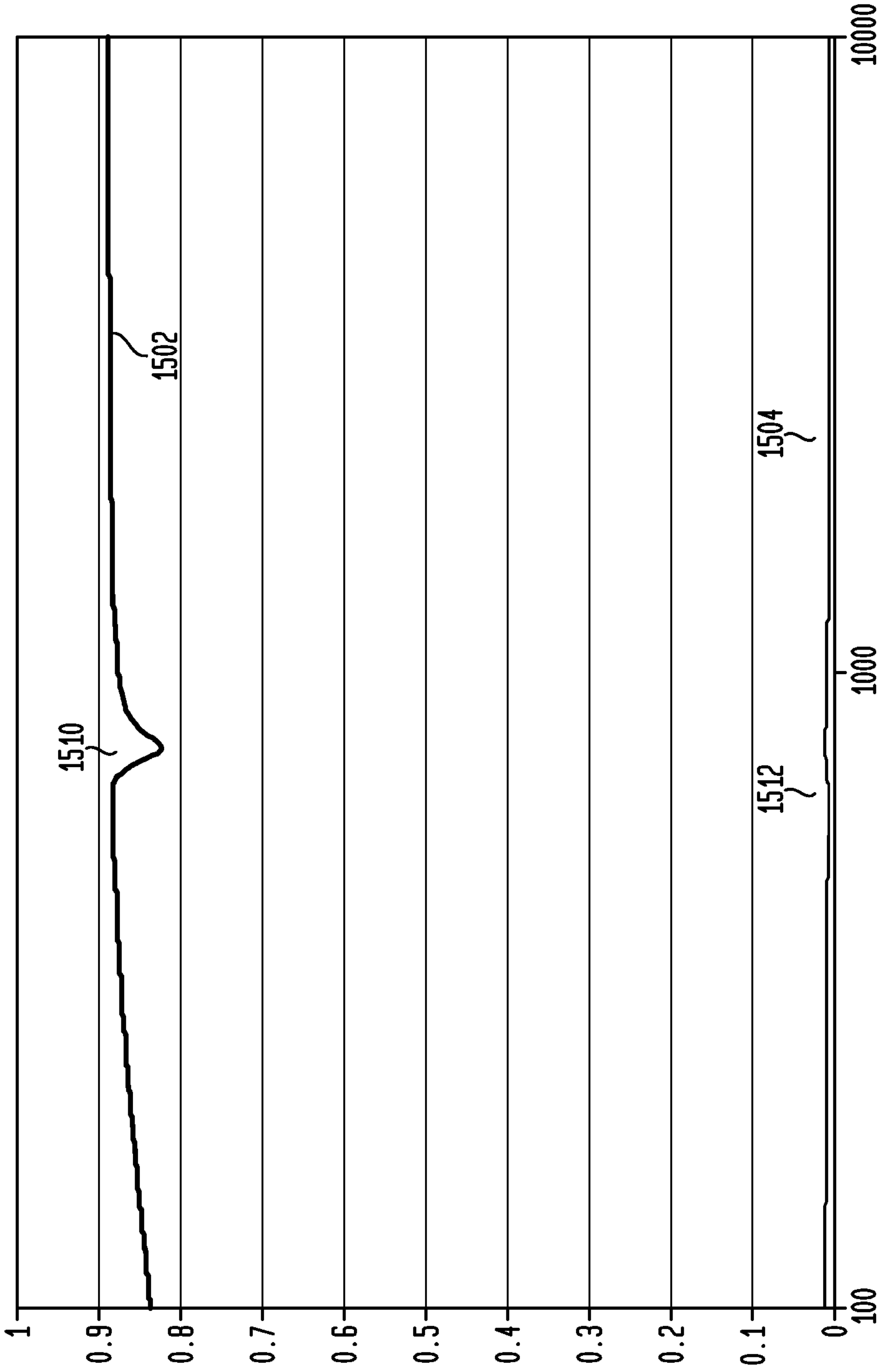
FIG. 15 illustrates an exemplary voltage curve for a voltage measured across an electromagnetic actuator, in accordance with an embodiment of the present invention.

FIG. 15 illustrates an exemplary voltage curve 1502 for a voltage measured across actuator 1440, where actuator 1440 is an electromagnetic actuator. In this example, the resonance peaks are identified using a frequency sweep, such as discussed above. As illustrated, curve 1502 comprises a discontinuity 1510 where the voltage drops more readily before returning to a move smooth curve shape. This discontinuity 1510 is re indicative of a resonance peak in the actuator at approximately 750 Hz. Also, illustrated is a current curve 1504 for the current measured through resistor 1406.

Current curve 1504 similarly includes a discontinuity 1512 at the resonance peak of actuator 1440 evidenced by the increase in the current at approximately 750 Hz before falling back to a more smooth curve shape. Although due to the scale of the current curve, the discontinuity 1512 is not as readily visible as discontinuity 1510, either the voltage curve 1502 or current curve 1504 is analyzed in embodiments for discontinuities indicative of the resonance peak of the actuator 1440. Further, as noted above, in embodiments, only one of the voltage across actuator 1440 or current through actuator 1440 is measured, rather than measuring both. Then, whichever parameter is measured is analyzed to identify the resonance peak.

Figure 16:
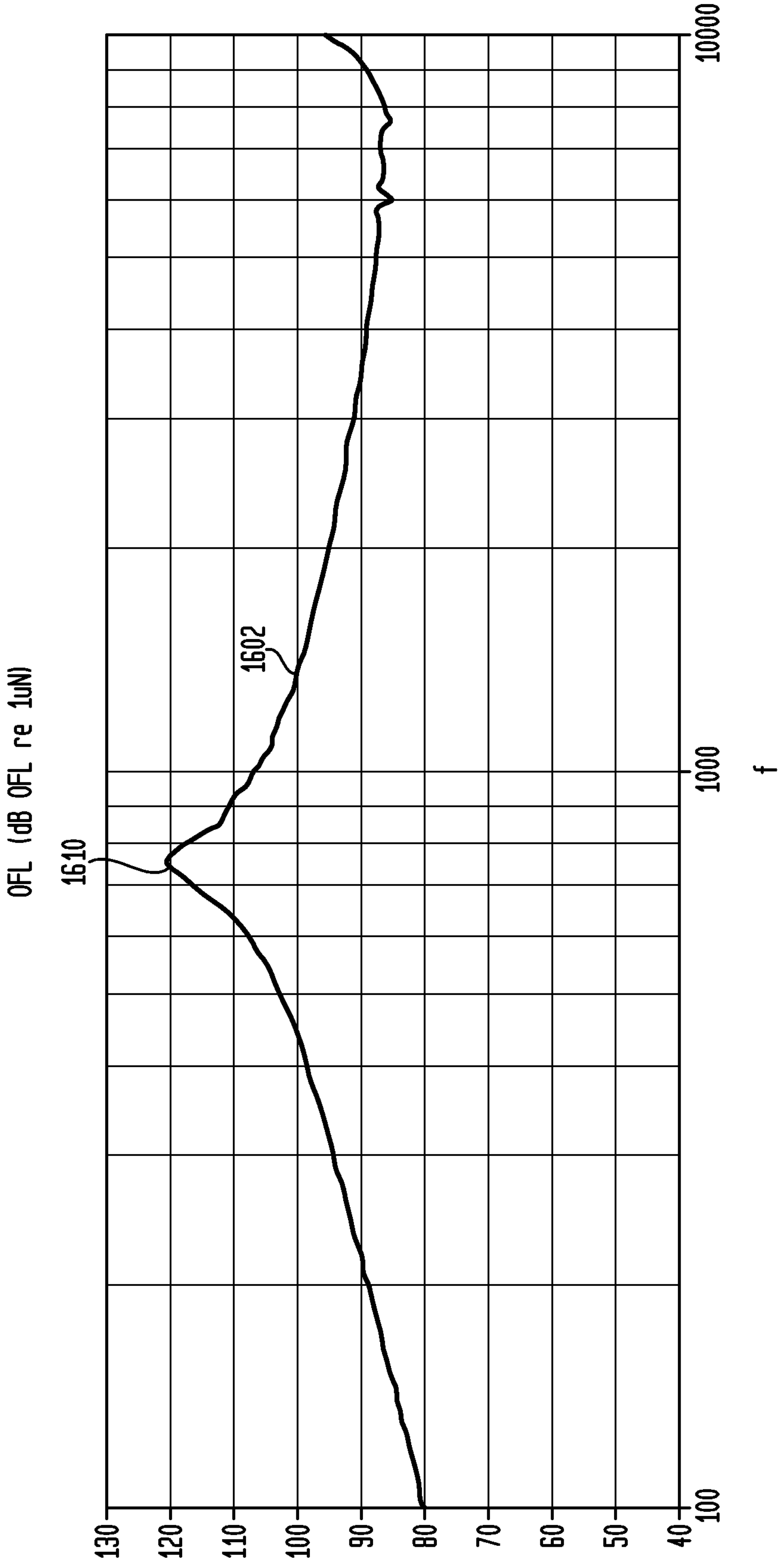
FIG. 16 illustrates an exemplary output force level curve for an electromagnetic actuator, in accordance with an embodiment of the present invention.

FIG. 16 illustrates an exemplary output force level curve 1602 in dB relative to 1 micro-Newton versus frequency for actuator 1440. This curve 1602 was measured using a Skull Simulator prior to attachment of the bone conduction device to the recipient. As illustrated, curve 1602 shows that actuator 1440 has resonance peak 1610 of approximately 750 Hz, which corresponds the resonance peaks identified by discontinuity 1510 of FIG. 15 measured after attachment of the bone conduction device to the recipient.

Figure 17:
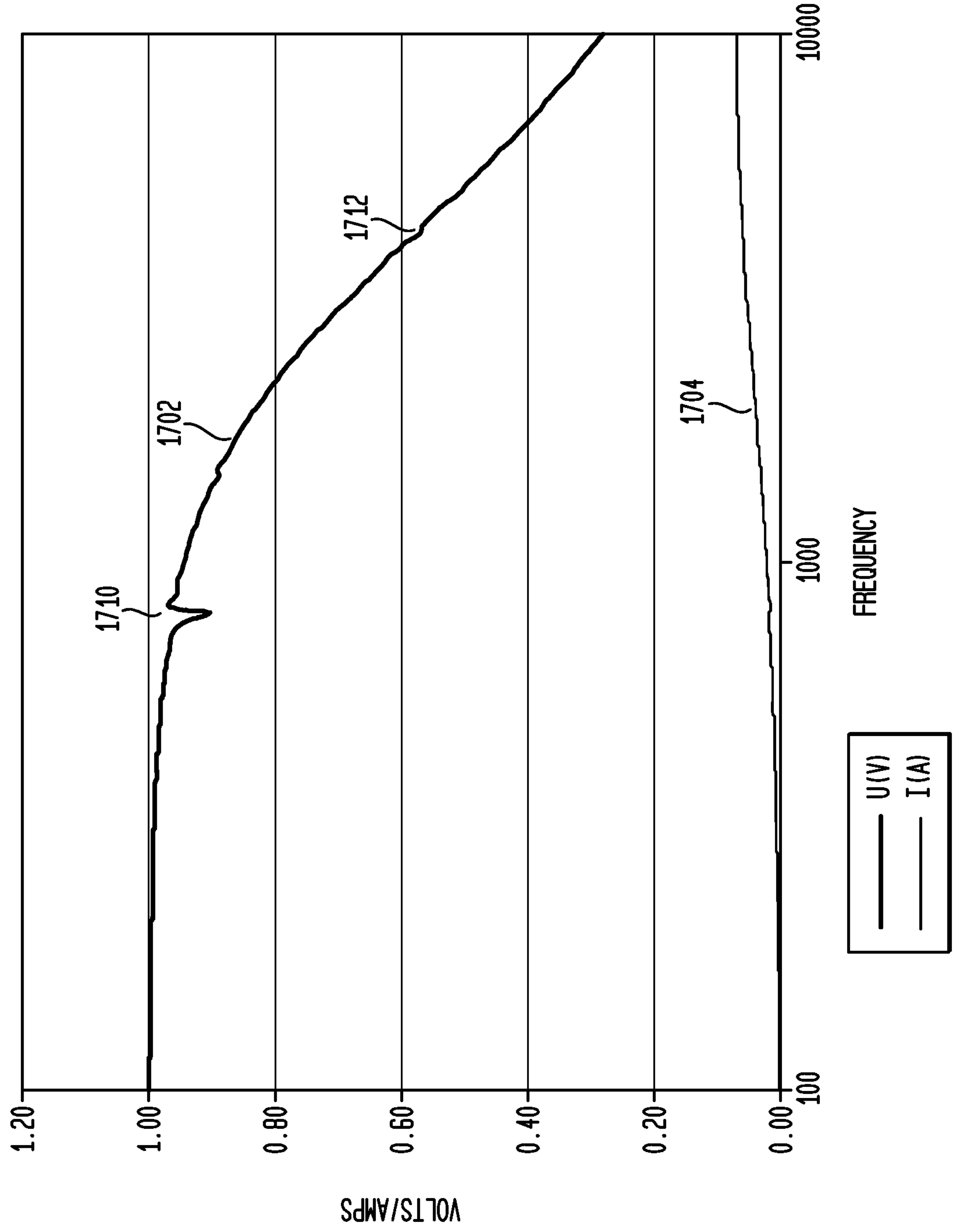
FIG. 17 illustrates an exemplary voltage curve for a voltage measured across a Piezo actuator, in accordance with an embodiment of the present invention.

FIG. 17 illustrates an exemplary voltage curve 1702 for a voltage measured across actuator 1440, where actuator 1440 is a Piezo actuator. In this example, the resonance peaks are identified using a frequency sweep, such as discussed above. As illustrated, curve 1702 comprises two discontinuities 1710 and 1712 where the voltage drops more readily before returning to a move smooth curve shape. These discontinuities 1710 and 1712 are indicative of resonance peaks in the actuator at approximately 800 Hz and 1325 Hz. Also, illustrated is a current curve 1704 for the current measured through resistor 1406.

Current curve 1704 similarly includes discontinuities at the resonance peaks of actuator 1440; although, due to the scale of the current curve, the discontinuities are not as readily visible as discontinuities 1710 and 1712. However, as with the other examples, either the voltage curve 1702 or current curve 1704 is analyzed in embodiments for discontinuities indicative of the resonance peak(s) of the actuator 1440.

Figure 18:
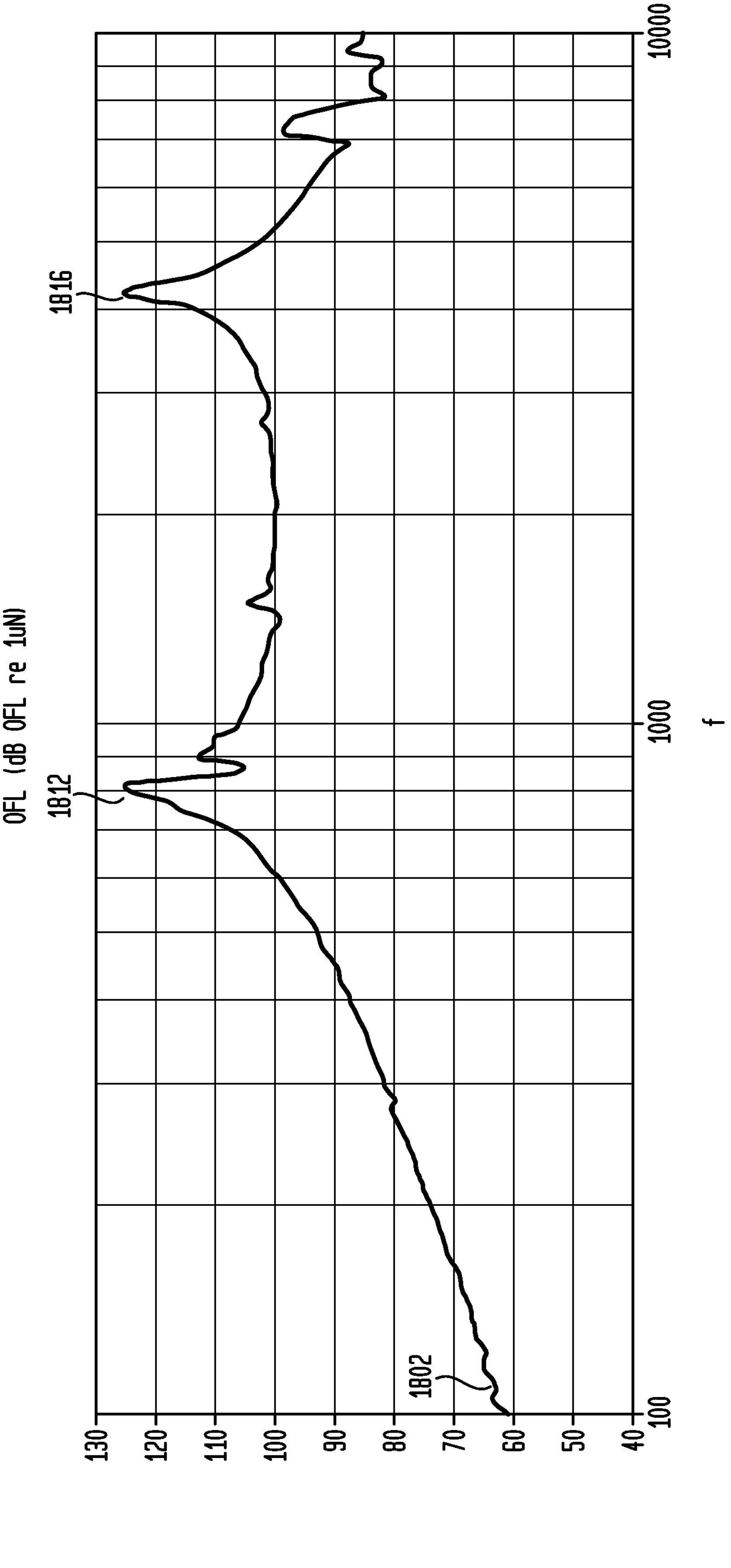
FIG. 18 illustrates an exemplary output force level curve for a Piezo actuator, in accordance with an embodiment of the present invention.

FIG. 18 illustrates an exemplary output force level curve 1802 in dB relative to 1 micro-Newton versus frequency for actuator 1440 where actuator 1440 is a Piezo actuator. This curve 1802 was measured using a Skull Simulator (i.e., a device that simulates the behavior of a human skull). As illustrated, curve 1802 shows that actuator 1440 has two resonance peaks 1810 and 1812 corresponding to the resonance peaks identified by discontinuities 1710 and 1712 of FIG. 17.

While various embodiments of the present invention have been described above, it should be understood that they have been presented by way of example only, and not limitation. It will be apparent to persons skilled in the relevant art that various changes in form and detail may be made therein without departing from the scope of the invention. Thus, the breadth and scope of the present invention should not be limited by any of the above-described exemplary embodiments, but should be defined only in accordance with the following claims and their equivalents.

What is claimed is:

1. An apparatus, comprising:

an actuator configured to apply mechanical stimulation to a recipient to cause a hearing percept by the recipient as a result of a signal provided to the actuator; and a measurement circuit, wherein the apparatus is configured to apply a signal to the actuator at a plurality of frequencies within an operational frequency range of the actuator to actuate the actuator, the measurement circuit is configured to measure an electrical phenomenon of the apparatus for respective applied signals at the plurality of frequencies, the measured phenomenon enables identification of at least one resonance frequency of the actuator, and the apparatus is configured to avoid feedback of the apparatus at the at least one resonance frequency based on the identification of the at least one resonance frequency.

2. The apparatus of claim 1, wherein the actuator is configured to apply mechanical stimulation to a middle ear of the recipient.

3. The apparatus of claim 1, wherein the measurement circuit is configured to obtain a signal from opposite sides of the actuator, and obtain a difference of the signals from opposite sides of the actuator in measuring voltage drop across the actuator.

4. The apparatus of claim 1, wherein:

the measured phenomenon enables identification of at least one resonance peak of the actuator.

5. The apparatus of claim 4, wherein the apparatus is further configured to:

analyze the measured electrical phenomenon to identify the at least one resonance peak of the actuator.

6. The apparatus of claim 1, wherein the apparatus is an auditory prosthesis.

7. The apparatus of claim 1, wherein the apparatus is a bone conduction device.

8. The apparatus of claim 1, wherein the apparatus is a transcutaneous auditory device.

9. The apparatus of claim 1, wherein the apparatus is configured to communicate transcutaneously to evoke the hearing percept.

10. The apparatus of claim 1, wherein the apparatus is configured to analyze the measured phenomenon to identify a discontinuity in the measured phenomenon, and identify the at least one resonance frequency based on the identified discontinuity.

11. The apparatus of claim 1, wherein the apparatus is configured to compensate for the identified at least one resonance frequency.

12. The apparatus of claim 11, wherein compensating for the identified at least one resonance frequency includes compensating for at least one resonance peak.

13. The apparatus of claim 1, wherein the measurement circuit is configured to measure over a range of frequencies from less than 250 Hz to more than 5000 Hz.

14. An apparatus, comprising:

an actuator configured to apply mechanical stimulation to a recipient to cause a hearing percept by the recipient as a result of a signal provided to the actuator; and a measurement circuit, wherein the apparatus is configured to apply a signal to the actuator at a plurality of frequencies within an operational frequency range of the actuator to actuate the actuator, the measurement circuit is configured to measure an electrical phenomenon of the apparatus for respective applied signals at the plurality of frequencies, the measured phenomenon enables identification of at least one resonance frequency of the actuator, and at least one of:

the measurement circuit is grounded;

the apparatus is further configured to analyze the measured electrical phenomenon to identify the at least one resonance frequency of the actuator; or the apparatus is configured to apply a voltage to the actuator at a plurality of frequencies to cause actuation of the actuator and measure at least one of a voltage across the actuator or a current through the actuator for respective applied voltages at the plurality of frequencies, thus measuring the electrical phenomenon.

15. The apparatus of claim 14, wherein the apparatus is further configured to analyze the measured electrical phenomenon to identify the at least one resonance frequency of the actuator.

16. The apparatus of claim 14, wherein the apparatus is configured to apply the voltage to the actuator at the plurality of frequencies to cause actuation of the actuator and measure the at least one of the voltage across the actuator or the current through the actuator for respective applied voltages at the plurality of frequencies, thus measuring the electrical phenomenon.

17. The apparatus of claim 14, wherein the measurement circuit is grounded.

18. An apparatus, comprising:

an actuator configured to apply mechanical stimulation to a recipient to cause a hearing percept by the recipient as a result of a signal provided to the actuator; and a measurement circuit, wherein the apparatus is configured to apply a signal to the actuator at a plurality of frequencies within an operational frequency range of the actuator to actuate the actuator, the measurement circuit is configured to measure an electrical phenomenon of the apparatus for respective applied signals at the plurality of frequencies, the measured phenomenon enables identification of at least one resonance frequency of the actuator, and the apparatus is configured to manage power consumption of the apparatus based on the identification of the at least one resonance frequency.

19. The apparatus of claim 18, wherein the apparatus is configured to avoid feedback of the apparatus at the at least one resonance frequency based on the identification of the at least one resonance frequency.

* * * * *